United States Patent
Cho et al.

(10) Patent No.: US 11,138,437 B2
(45) Date of Patent: Oct. 5, 2021

(54) IMAGE PROCESSING APPARATUS AND METHOD THEREOF

(71) Applicant: SAMSUNG ELECTRONICS CO., LTD., Suwon-si (KR)

(72) Inventors: Daesung Cho, Suwon-si (KR); Wooseok Kang, Suwon-si (KR); Ilhyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/685,553

(22) Filed: Nov. 15, 2019

(65) Prior Publication Data

US 2020/0160062 A1    May 21, 2020

(30) Foreign Application Priority Data

Nov. 16, 2018   (KR) .................. 10-2018-0141949

(51) Int. Cl.
  G06K 9/00      (2006.01)
  G06T 7/00      (2017.01)
  (Continued)

(52) U.S. Cl.
  CPC .......... G06K 9/00718 (2013.01); G06K 9/03 (2013.01); G06T 7/0002 (2013.01); G06T 7/90 (2017.01);
  (Continued)

(58) Field of Classification Search
  CPC ........ G06K 9/00718; G06K 9/03; G06T 7/90; G06T 7/0002; G06T 2207/10016;
  (Continued)

(56) References Cited

U.S. PATENT DOCUMENTS 6,718,063 B1 * 4/2004 Lennon .................. G06K 9/469
                                                382/224
9,787,893 B1   10/2017 Nenonen et al.
(Continued)

FOREIGN PATENT DOCUMENTS

JP        5084615 B2   11/2012
JP        6249343 B2   12/2017
(Continued)

OTHER PUBLICATIONS

International Search Report (PCT/ISA/210) and Written Opinion (PCT/ISA/237) dated Feb. 26, 2020 issued by the International Searching Authority in International Application No. PCT/KR2019/015567.
(Continued)

Primary Examiner — Jonathan S Lee
(74) Attorney, Agent, or Firm — Sughrue Mion, PLLC

(57) ABSTRACT

Provided are an image processing apparatus and method. The image processing apparatus includes a decoder configured to decode image frames of an image; an image quality controller configured to obtain a genre recognition confidence of a previous image frame and a genre recognition confidence of a current image frame, and identify image quality control factor value, based on the genre recognition confidence of the previous image frame and the genre recognition confidence of the current image frame; and an image quality processor configured to image-quality process at least one of the decoded image frames by using the image quality control factor value, and output the processed at least one of the decoded image frames.

19 Claims, 16 Drawing Sheets

(51) Int. Cl.
*G06T 7/90* (2017.01)
*G06K 9/03* (2006.01)
*H04N 9/64* (2006.01)

(52) U.S. Cl.
CPC .............. *G06T 2207/10016* (2013.01); *G06T 2207/10024* (2013.01); *G06T 2207/20084* (2013.01); *G06T 2207/30168* (2013.01); *G06T 2207/30221* (2013.01); *H04N 9/646* (2013.01)

(58) Field of Classification Search
CPC . G06T 2207/10024; G06T 2207/20084; G06T 2207/30168; G06T 2207/30221; H04N 9/646
USPC ........................................................ 382/165
See application file for complete search history.

(56) References Cited

U.S. PATENT DOCUMENTS

| | | | |
|---|---|---|---|
| 10,009,657 | B2 | 6/2018 | Kim et al. |
| 10,171,770 | B2 | 1/2019 | Unno |
| 10,402,698 | B1 * | 9/2019 | Tse ..................... G06K 9/00765 |
| 2008/0019669 | A1 | 1/2008 | Girshick et al. |
| 2012/0269425 | A1 * | 10/2012 | Marchesotti ........... G06N 20/00 |
| | | | 382/159 |
| 2014/0362296 | A1 * | 12/2014 | More ...................... G09G 5/14 |
| | | | 348/576 |
| 2015/0130857 | A1 | 5/2015 | Yoshida et al. |
| 2015/0256891 | A1 | 9/2015 | Kim et al. |
| 2016/0284066 | A1 * | 9/2016 | Dong ........................ G06T 5/50 |
| 2017/0295317 | A1 * | 10/2017 | Nenonen ................ H04N 9/735 |
| 2018/0082123 | A1 | 3/2018 | Katz et al. |

FOREIGN PATENT DOCUMENTS

| | | |
|---|---|---|
| KR | 1020160039477 A | 4/2016 |
| KR | 10-1717733 B1 | 3/2017 |

OTHER PUBLICATIONS

Huang-Chia Shih, "A Survey of Content-Aware Video Analysis for Sports", May 2018, IEEE Transactions on Circuits and Systems for Video Technology, vol. 28, No. 5, pp. 1212-1231 (20 pages total).
Alex Krizhevsky et al., "ImageNet Classification with Deep Convolutional Neural Networks", 2012, Advances in Neural Information Processing Systems (NIPS), pp. 1-9, (9 pages total).
Sami Abu-El-Haija et al., "YouTube—8M: A Large-Scale Video Classification Benchmark", Sep. 27, 2016, Computer Vision and Pattern Recognition (10 pages total).
Olga Russakovsky et al., "ImageNet Large Scale Visual Recognition Challenge", Dec. 2015, vol. 115, Issue 3, pp. 1-43 (43 pp. total).

* cited by examiner

IMAGE PROCESSING APPARATUS AND METHOD THEREOF

CROSS-REFERENCE TO RELATED APPLICATION(S)

This application is based on and claims priority under 35 U.S.C. § 119 to Korean Patent Application No. 10-2018-0141949, filed on Nov. 16, 2018, in the Korean Intellectual Property Office, the disclosure of which is incorporated by reference herein in its entirety.

BACKGROUND

1. Field

The disclosure relates to an image processing apparatus and an operation method thereof, and more particularly, to an image processing method and apparatus which are capable of identifying a genre of content and automatically and adequately controlling the quality of an image corresponding to the content.

2. Description of Related Art

In various types of display devices such as televisions, smart phones, and monitors, various genres of image content such as sports, dramas, news, movies, and documentary may be reproduced according to users' preference. However, adequate image quality processing may need to be performed on content corresponding to each genre according to features of the genre. For example, in a case of a sports genre, more realistic experiences may be provided to users when image quality processing is performed focusing on dynamic characteristics of content showing a large amount motions.

In related art display devices, adequate screen control was conducted through manual operations based on a menu. For example, a user may select a sports mode to view a sports image or select a general mode to view a general image, and a display device provides image quality processing according to a mode matching user setting when the user sets image quality control factors in each mode. However, manually performing image quality control as described above is quite inconvenient, and users may have difficulties in reproducing content with adequate image quality due to lack of expert knowledge with regard to the necessary factors for image quality control. Image quality control is not easy to perform and needs expert knowledge, because various factors necessary for adequate image quality should be controlled through various steps.

Artificial intelligence (AI) systems are computer systems capable of achieving human-level intelligence, and capable of training itself, deciding, and becoming smarter, unlike existing rule-based smart systems. As use of such AI systems increases, recognition rates thereof further improve and users' preferences can be more accurately understood. Accordingly, the existing rule-based smart systems are gradually being replaced with deep-learning-based AI systems.

AI technology includes machine learning (e.g., deep learning) and element technologies using machine learning. Machine learning is algorithm technology capable of self-sorting/learning features of input data, uses a machine learning algorithm such as deep learning, and includes technical fields, including linguistic comprehension, visual comprehension, inference/prediction, knowledge representation, motion control, etc.

Knowledge representation is a technique for automatically processing human experience information, based on knowledge data, and includes knowledge building (data generation/classification), knowledge management (data utilization), etc. Motion control is a technique for controlling self-driving of a vehicle and a robot's movement, and includes motion control (navigation, collision avoidance, traveling, etc.), operation control (behavior control), etc.

In scene-recognition-based genre recognition methods applied in the related art, genre recognition errors frequently occurred. Thus, the difference in image quality between frames may be large when an erroneous recognition result is directly applied to image quality control. Therefore, a result of genre recognition cannot directly apply to genre-specific automatic image quality control.

SUMMARY

Provided are an image processing apparatus and method capable of performing adequate image quality control according to a genre of image content by more reliably identifying the genre of the image content.

Additional aspects will be set forth in part in the description which follows and, in part, will be apparent from the description, or may be learned by practice of the presented embodiments of the disclosure.

According to an aspect of the disclosure, there is provided an image processing apparatus comprising: a decoder configured to decode image frames; an image quality controller configured to obtain a first genre recognition confidence of a previous image frame and a second genre recognition confidence of a current image frame, and identify an image quality control factor value, based on the first genre recognition confidence of the previous image frame and the second genre recognition confidence of the current image frame; and an image quality processor configured to process image quality of at least one of the decoded image frames based on the image quality control factor value, and output the processed at least one of the decoded image frames.

The image quality controller may be further configured to: obtain a weighted average of the first genre recognition confidence of the previous image frame and the second genre recognition confidence of the current image frame; and identify the image quality control factor value based on the weighted average.

The image quality controller may be further configured to correct the image quality control factor value to maintain a difference between the image quality control factor value identified for the current image frame and a previous image quality control factor value identified for the previous image frame to be below a threshold.

The image quality controller may be further configured to: based on image frames received for a predetermined time having same genre, identify the same genre as a new genre; and based on the identifying of the same genre as the new genre, obtain the first genre recognition confidence of the previous image frame and the second genre recognition confidence of the current image frame.

The image quality controller may be further configured to identify the image quality control factor value based on a first main-color probability distribution of the previous image frame and a second main-color current image probability distribution of the current image frame.

The image quality controller may be further configured to: obtain a weighted average of the first main-color probability distribution of the previous image frame and the second main-color probability distribution of the current image frame; identify the image quality control factor value based on a weighted average of the first genre recognition confidence and the second genre recognition confidence and the weighted average of the first main-color probability distribution and the second main-color probability distribution; and process the image quality of the image frames based on the image quality control factor value.

The image quality controller may be further configured to: identify whether the current image frame is a scene change frame; and based on identifying that the current image frame is the scene change frame, set the first genre recognition confidence of the previous image frame to a minimum value, and identify the image quality control factor value, based on the first genre recognition confidence of the previous image frame set to the minimum value and the second genre recognition confidence of the current image frame.

The image quality controller may be further configured to: identify whether the current image frame is a scene change frame and whether a level of change of main color information of the current image frame exceeds a threshold; based on identifying that the current image frame is the scene change frame and the level of change of the main color information exceeds the threshold, set the first genre recognition confidence of the previous image frame to a minimum value, and identify the image quality control factor value, based on the first genre recognition confidence of the previous image frame set to the minimum value and the second genre recognition confidence of the current image frame; and based on identifying that the current image frame is the scene change frame and the level change of the main color information does not exceed the threshold, identify the image quality control factor value, based on the first genre recognition confidence of the previous image frame and the second genre recognition confidence of the current image frame.

The image quality controller may be further configured to identify the first genre recognition confidence of the previous image frame and the second genre recognition confidence of the current image frame based on at least one neural network.

According to another aspect of the disclosure, there is provided an image processing method comprising: decoding image frames; performing image quality control by obtaining a first genre recognition confidence of a previous image frame and a second genre recognition confidence of a current image frame, and identifying an image quality control factor value, based on the first genre recognition confidence of the previous image frame and the second genre recognition confidence of the current image frame; and processing image quality of at least one of the decoded image frames based on the image quality control factor value, and outputting the processed at least one of the decoded image frames.

The performing of the image quality control may comprise: obtaining a first weighted average of the first genre recognition confidence of the previous image frame and the second genre recognition confidence of the current image frame; and identifying the image quality control factor value based on the weighted average.

The performing of the image quality control may comprise correcting the image quality control factor value to maintain a difference between the image quality control factor value identified for the current image frame and a previous image quality control factor value identified for the previous image frame to be below a threshold.

The performing of the image quality control may comprise: based on image frames received for a predetermined time have same genre, identifying the same genre as a new genre; and based on the identifying of the same genre as the new genre, obtaining the first genre recognition confidence of the previous image frame and the second genre recognition confidence of the current image frame.

The performing of the image quality control may comprise identifying the image quality control factor value based on a first main-color probability distribution of the previous image frame and a second main-color probability distribution of the current image frame.

The performing of the image quality control may comprises: obtaining a weighted average of the first main-color probability distribution of the previous image frame and the second main-color probability distribution of the current image frame; and identifying the image quality control factor value based on the a weighted average of the first genre recognition confidence and the second genre recognition confidence and the weighted average of the first main-color probability distribution and the second main-color probability distribution, and the processing the image quality of the at least one of the decoded image frames comprises processing the image quality of the image frames based on the image quality control factor value.

The performing of the image quality control may comprise: identifying whether the current image frame is a scene change frame; and based on identifying that the current image frame is the scene change frame, setting the first genre recognition confidence of the previous image frame to a minimum value, and identifying the image quality control factor value, based on the first genre recognition confidence of the previous image frame set to the minimum value and the second genre recognition confidence of the current image frame.

The performing of the image quality control may comprise: identifying whether the current image frame is a scene change frame and whether a level of change of main color information of the current image frame exceeds a threshold; based on identifying that the current image frame is the scene change frame and the level of change of the main color information exceeds the threshold, setting the first genre recognition confidence of the previous image frame to a minimum value, and identifying the image quality control factor value, based on the first genre recognition confidence of the previous image frame set to the minimum value and the second genre recognition confidence of the current image frame; and based on identifying that the current image frame is the scene change frame and the level of change of the main color information does not exceed the threshold, identifying the image quality control factor value, based on the first genre recognition confidence of the previous image frame and the second genre recognition confidence of the current image frame.

The performing of the image quality control may comprise identifying the first genre recognition confidence of the previous image frame and the second genre recognition confidence of the current image frame based on at least one neural network.

According to another aspect of the disclosure, there is provided a computer program product comprising a computer-readable recording medium storing a program for executing an image processing method, wherein the image processing method comprises: decoding image frames of an image; performing image quality control by obtaining a first genre recognition confidence of a previous image frame and a second genre recognition confidence of a current image frame, and identifying an image quality control factor value, based on the first genre recognition confidence of the previous image frame and the second genre recognition confidence of the current image frame; and processing image quality of at least one of the decoded image frames based on the image quality control factor value, and outputting the processed at least one of the decoded image frames.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
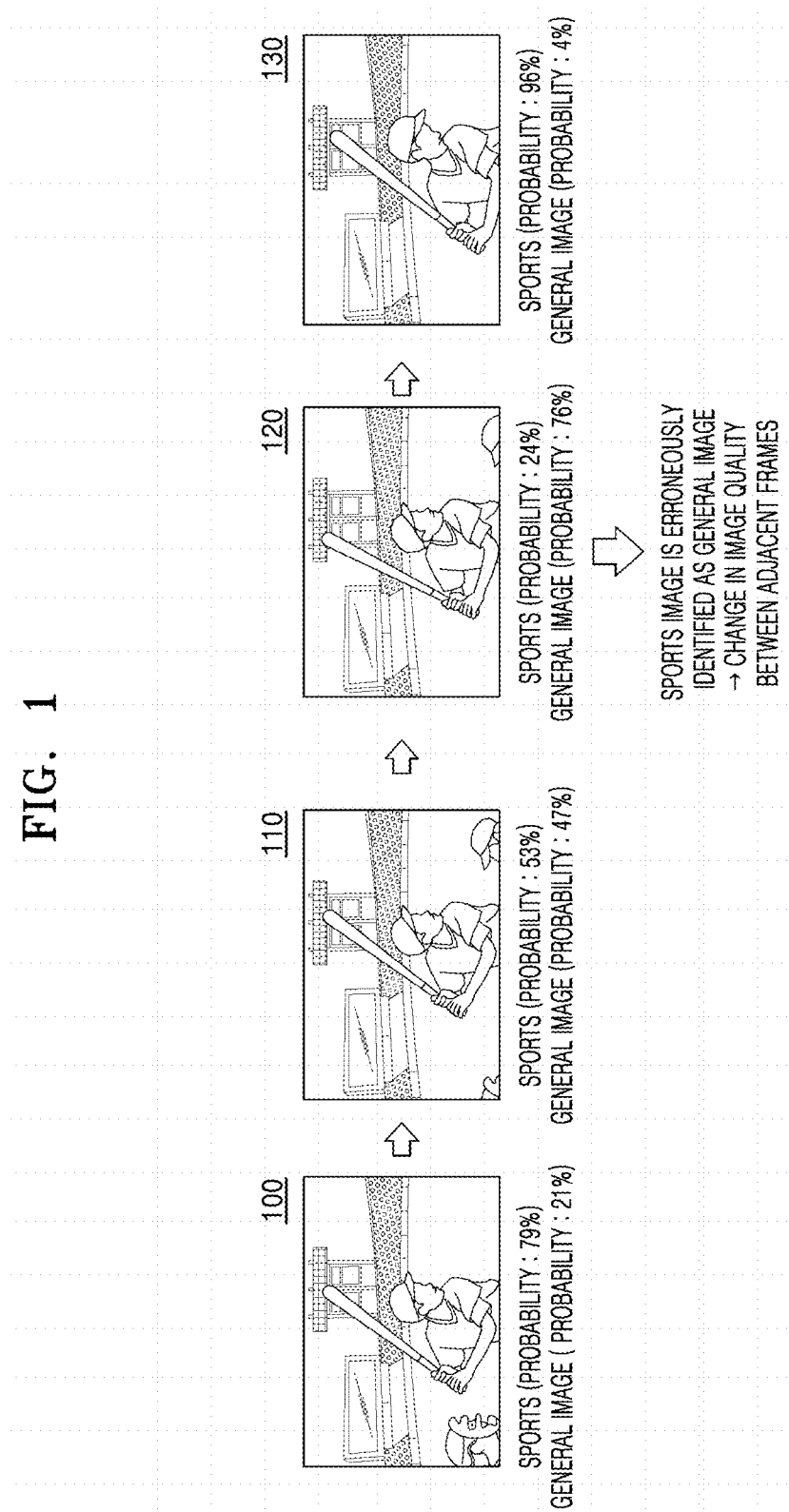
FIG. 1 is a reference diagram for explaining an example of identifying a genre of content, based on scene recognition.

The terms used in the disclosure will be briefly described and then the disclosure will be described in detail.

In the disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant, and in this case, the meanings of these terms will be explained in corresponding parts of the disclosure in detail. Thus, the terms used herein should be defined not based on the names thereof but based on the meanings thereof and the whole context of the disclosure.

It will be understood that when a part is referred to "including" an element throughout the specification, the part may include other elements as well unless stated otherwise. Terms such as "unit", "module," and the like, when used herein, represent units for processing at least one function or operation, which may be implemented by hardware, software, or a combination of hardware and software.

Hereinafter, embodiments will be described in detail with reference to the accompanying drawings, so that the embodiments may be easily implemented by those of ordinary skill in the art. However, the disclosure may be embodied in many different forms and is not limited to the embodiments set forth herein. For clarity, parts not related to explaining the disclosure are omitted in the drawings, and like components are denoted by like reference numerals throughout the specification.

Throughout the disclosure, the expression "at least one of a, b or c" indicates only a, only b, only c, both a and b, both a and c, both b and c, all of a, b, and c, or variations thereof.

The term "user" used in embodiments of the description refers to a person who controls a function or operation of an image display device using a control device, and may include a viewer, an administrator, or an installer.

FIG. 1 is a reference diagram for explaining an example of identifying a genre of content, based on scene recognition.

A genre of content may be identified by identifying scenes of the content.

Referring to FIG. 1, scenes of a first frame 100, a second frame 110, a third frame 120, and a fourth frame 130 are identified, and a probability that a genre of each of these frames is a sports image and a probability that each of these frames is a general image other than a sports image are displayed. All the first to fourth frames 100 to 130 represent scenes of the same sports image. The probabilities that the genres of the first frame 100, the second frame 110, and the fourth frame 130 are sports are higher than the probabilities that the first frame 100, the second frame 110, and the fourth frame 130 are general images and thus a result of identifying the genres of these frames may indicate a sports genre. However, although the third frame 120 represents part of the same sports image as the first frame 100 and the like, the probability that the genre of the third frame 120 is sports is 24% and the probability that the third frame 120 is a general image is 76%. Thus, a result of identifying the genre of the third frame 120 may indicate a general image.

As described above, genre recognition errors have frequently occurred in scene-recognition-based genre recognition of the related art. Thus, the difference in image quality between frames may be large when an erroneous recognition result is directly applied to image quality control. Thus, deterioration of image quality cannot be prevented when a result of genre recognition of the related art is directly applied to genre-specific automatic image quality control.

Accordingly, embodiments set forth herein relate to a method of minimizing deterioration of image quality due to a genre recognition error and minimizing an excessive change of image quality with respect to a previous frame, when a genre is identified based on video scene recognition and adequate image quality control is performed in units of scenes according to the genre.

Figure 2:
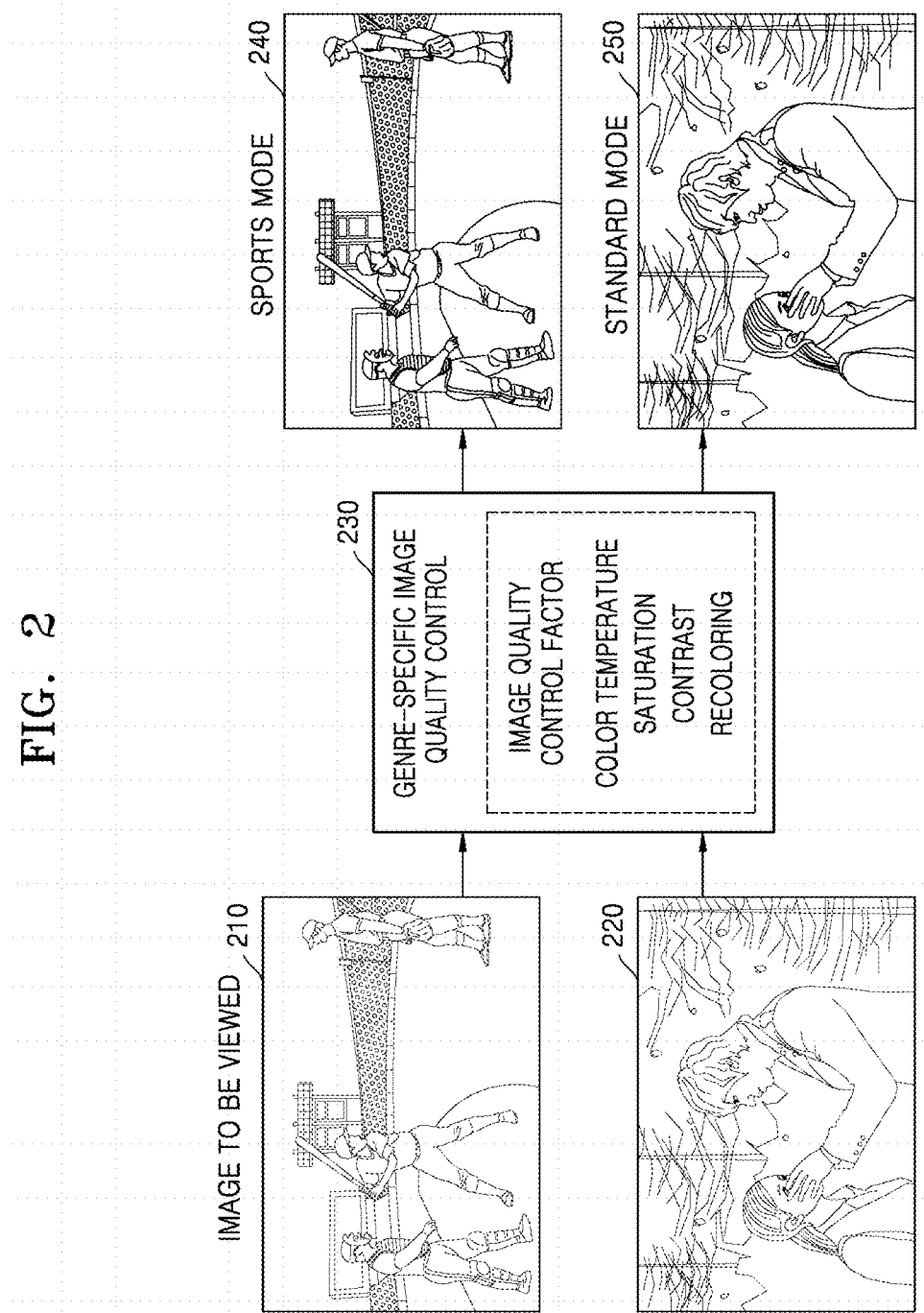
FIG. 2 is a reference diagram for explaining a method of performing adequate genre-specific image quality control by performing genre-specific image quality control on an image to be viewed, according to an embodiment.

FIG. 2 is a reference diagram for explaining a method of performing adequate genre-specific image quality control by performing genre-specific image quality control on an image to be viewed, according to an embodiment.

Referring to FIG. 2, an image viewed by a user may include various types of genres. For example, the image that the user views may include a sports image 210 and a movie image 220. By performing genre-specific image quality control 230 on the image that the user views, a sports image 240 on which image quality control suitable for a sports genre is performed may be output when a genre of the image is identified as the sports genre, and a movie image 250 on which image quality control suitable for a movie genre is performed may be output when the genre of the image is identified as the movie genre. Image quality control factors may include color temperature, saturation, contrast, recoloring, etc. In an embodiment, the genre of the image that the user views may be more accurately identified to reduce recognition errors through the genre-specific image quality control 230, thereby preventing deterioration of image quality due to recognition errors. In an embodiment, a result of identifying a genre of at least one previous frame of image may be used in the genre-specific image quality control 230 to more accurately identify a genre of the image as described above.

Figure 3:
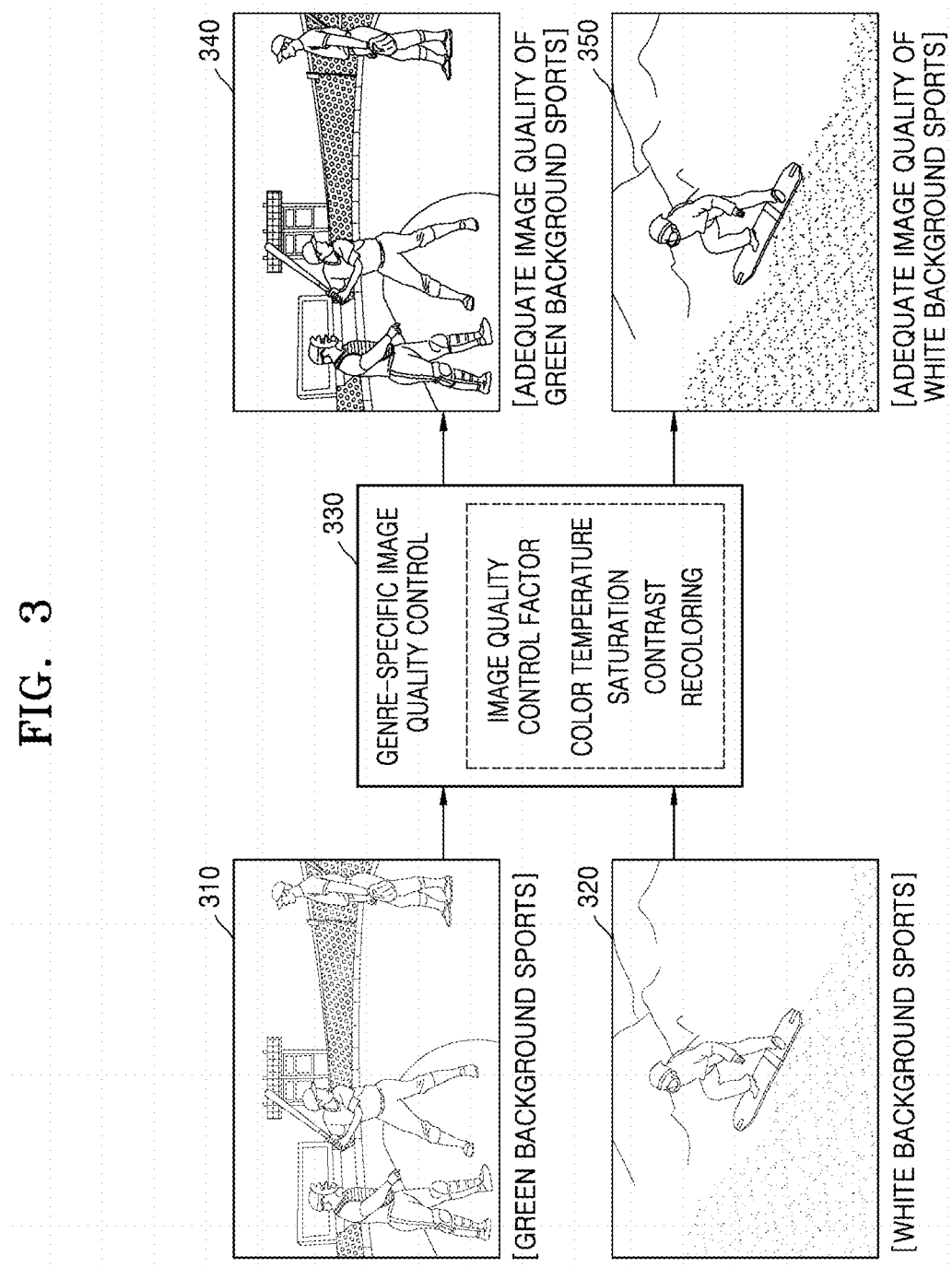
FIG. 3 is a reference diagram for explaining a method of performing adequate genre-specific image quality control by performing genre-specific image quality control on an image to be viewed, according to another embodiment.

FIG. 3 is a reference diagram for explaining a method of performing adequate genre-specific image quality control by performing genre-specific image quality control on image to be viewed, according to another embodiment.

Referring to FIG. 3, image viewed by a user may include various types of genres. For example, image that a user views may include a green background sports image 310 and a white background sports image 320 among sports images. The green background sports image is an image of a game which is being played on green grass or a green field and thus in which green color is dominant, and may include, for example, an image of a soccer or baseball game. The white background sports image is an image of a game which is being played on the white ice or field and thus in which white color is dominant, and may include an image of a general winter sports game or an indoor ice sports game. The dominant color may not be limited to green or white, and may include other colors corresponding to the field or area the sporting event is played. By performing genre-specific image quality control 330 on the image that the user views, a sports image 340 on which image quality control suitable for a green background sports genre is performed may be output when a genre of the image is identified as the green background sports genre, and a sports image 350 on which image quality control suitable for a white background sports genre is performed may be output when the genre of the image is identified as the white background sports genre. In an embodiment, the genre of the image that the user views may be more accurately identified to reduce recognition errors through the genre-specific image quality control 330, thereby preventing deterioration of image quality due to recognition errors. In an embodiment, information regarding major colors used in the image may further be used in the genre-specific image quality control 330 to identify whether the image is a white image or a green image of the same genre.

Figure 4:
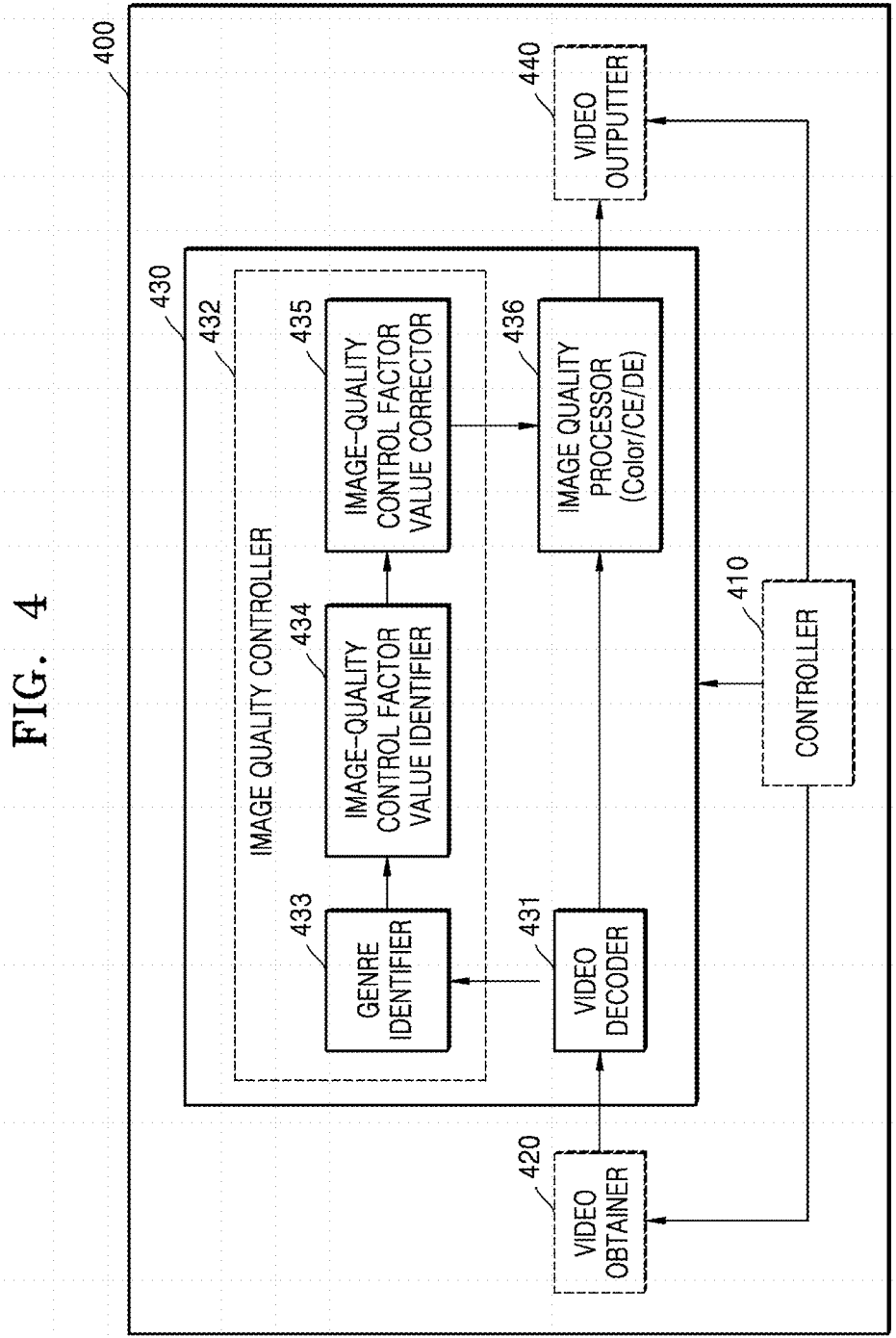
FIG. 4 is a schematic block diagram of an image processing apparatus according to an embodiment.

FIG. 4 is a schematic block diagram of an image processing apparatus 400 according to an embodiment.

Referring to FIG. 4, the image processing apparatus 400 may include a controller 410, a video obtainer 420, an image quality controller 430, and a video outputter 440.

The image processing apparatus 400 may include various display devices such as a television, a smart phone, a monitor, and a personal digital assistant (PDA).

The controller 410 may include at least one processor for overall control of the components of the image processing apparatus 400.

The video obtainer 420 may obtain an image to be image-quality processed from various sources such as an internal storage device, an external storage device, a tuner, a set-top box, and a network.

According to an embodiment, the image quality controller 430 may include a video decoder 431, an image quality controller 432 and an image quality processor 436.

The video decoder 431 may decode a video received from the video obtainer 420, and transmit the decoded video to the image quality controller 430 and the image quality processor 436.

An image quality controller 432 may identify image quality control factor value to be used for image quality control, based on an image frame received from the video decoder 431.

In an embodiment, the image quality controller 432 may identify genre recognition confidence of a previous image frame and genre recognition confidence of a current image frame, and then identify the image quality control factor value, based on the genre recognition confidence of the previous image frame and the genre recognition confidence of the current image frame.

As described above, the image quality controller 432 may recognize the genre of the image more reliably by identifying not only the genre recognition confidence of the current image frame but also the genre recognition confidence of the previous image frame.

In an embodiment, the image quality controller 432 may calculate a weighted average of the genre recognition confidence of the previous image frame and the genre recognition confidence of the current image frame, and identify the image quality control factor value by using the weighted average.

As described above, the image quality controller 432 may operate the system more flexibly by identifying a weight to be added to the genre recognition confidence of the previous image frame and a weight to be added to the genre recognition confidence of the current image frame. Features of the previous image frame may be more reflected in recognition of a genre of the image by increasing the weight to be added to the genre recognition confidence of the previous image frame, and may be more excluded in the recognition of the genre of the image by increasing the weight to be added to the genre recognition confidence of the current image frame.

In an embodiment, the image quality controller 432 may correct the image quality control factor value such that the difference between the image quality control factor value identified for the current image frame and previous image quality control factor value identified for the previous image frame does not exceed a threshold.

As described above, the image quality controller 432 may correct the image quality control factor value such that the difference between the image quality control factor value identified for the current image frame and the previous image quality control factor value identified for the previous image frame does not exceed the threshold, so that the difference in image quality between the current image frame and the previous image frame may be prevented from being extremely large even when the difference between the image quality control factor values thereof is large.

In an embodiment, when the same genre is repeatedly identified from image frames received for a predetermined time, the image quality controller 432 may identify the same genre as a new genre and then identify genre recognition confidence of the current image frame and genre recognition confidence of the current image frame according to the new genre.

In an embodiment, the image quality controller 432 may identify the image quality control factor value by further using a main-color probability distribution of the previous image frame and a main-color probability distribution of the current image frame.

As described above, the image quality controller 432 may identify the image quality control factor value by further using the main-color probability distribution of the previous image frame and the main-color probability distribution of the current image frame to perform image quality control while reflecting the main colors used in the image, as well as the genre of the image.

In an embodiment, the image quality controller 432 may calculate a weighted average of a main-color probability of the previous image frame and a main-color probability of the current image frame, and identify color control factor value by using the weighted average of the genre recognition reliabilities and the weighted average of the main-color probabilities.

In an embodiment, the image quality controller 432 may identify whether the current image frame is a scene change frame, set the genre recognition confidence of the previous image frame to a minimum value when the current image frame is the scene change frame, and identify the image quality factor value, based on the set genre recognition confidence of the previous image frame and the genre recognition confidence of the current image frame.

In an embodiment, the image quality controller 432 may identify whether the current image frame is the scene change frame and whether a change in information regarding the main colors of the current image frame exceeds a threshold; set the genre recognition confidence of the previous image frame to a minimum value and identify the image quality control factor value, based on the set genre recognition confidence of the previous image frame and the genre recognition confidence of the current image frame, when the current image frame is the scene change frame and the change in the information regarding the main colors of the current image frame exceeds the threshold; and identify the image quality control factor value, based on the genre recognition confidence of the previous image frame and the genre recognition confidence of the current image frame, when the current image frame is the scene change frame and the change in the information regarding the main colors of the current image frame does not exceed the threshold.

In an embodiment, the image quality controller 432 may obtain the genre recognition confidence of the previous image frame and the genre recognition confidence of the current image frame by using at least one neural network.

According to an embodiment, the image quality controller 432 may include a genre identifier 433, an image-quality control factor value identifier 434 and an image-quality control factor value corrector 435.

The genre identifier 433 may identify a genre corresponding to a received image frame. For example, the genre identifier 433 may identify a genre of an input image by classifying a scene of the image or identifying a specific object in the scene. For example, the genre identifier 433 may identify the genre of the image as a sports genre by identifying an object, such as a player, a ball, or a stadium, in the scene of the image. Alternatively, in case that the genre of the image is identified as the sports genre, the genre of the image may be determined when the genre of the image is repeatedly identified for a certain frame duration or for a certain time period. To this end, the genre identifier 433 may identify genre recognition confidence of the image, considering not only genre recognition confidence of a current image frame but also genre recognition confidence of at least one previous image frame. In this case, the genre identifier 433 may use the genre recognition confidence of the current image frame and a weighted average of the genre recognition confidence of the at least one previous image frame.

The image-quality control factor value identifier 434 may identify value of at least one image quality control factor by using the genre recognition confidence of the current image frame and the weighted average of the genre recognition confidence of the at least one previous image frame. Examples of the image quality control factor may include, for example, color, contrast enhancement (CE), detail enhancement (DE), etc. The image quality control factor will be described with reference to FIG. 15 below.

For example, the image-quality control factor value identifier 434 may identify the image quality control factor value in proportion to the weighted average.

The image-quality control factor value corrector 435 may correct the identified image quality control factor value. For example, the image-quality control factor value corrector 435 may correct the image quality control factor value identified for the current image frame not to be significantly different from the image quality control factor value identified for the previous image frame.

An image quality processor 436 may image-quality process an image received from the video decoder 431 by using the image quality control factor value received by the image-quality control factor value corrector 435, and output the processed image.

The video outputter 440 may output the image that is image-quality processed by the image quality processor 436.

Figure 5:
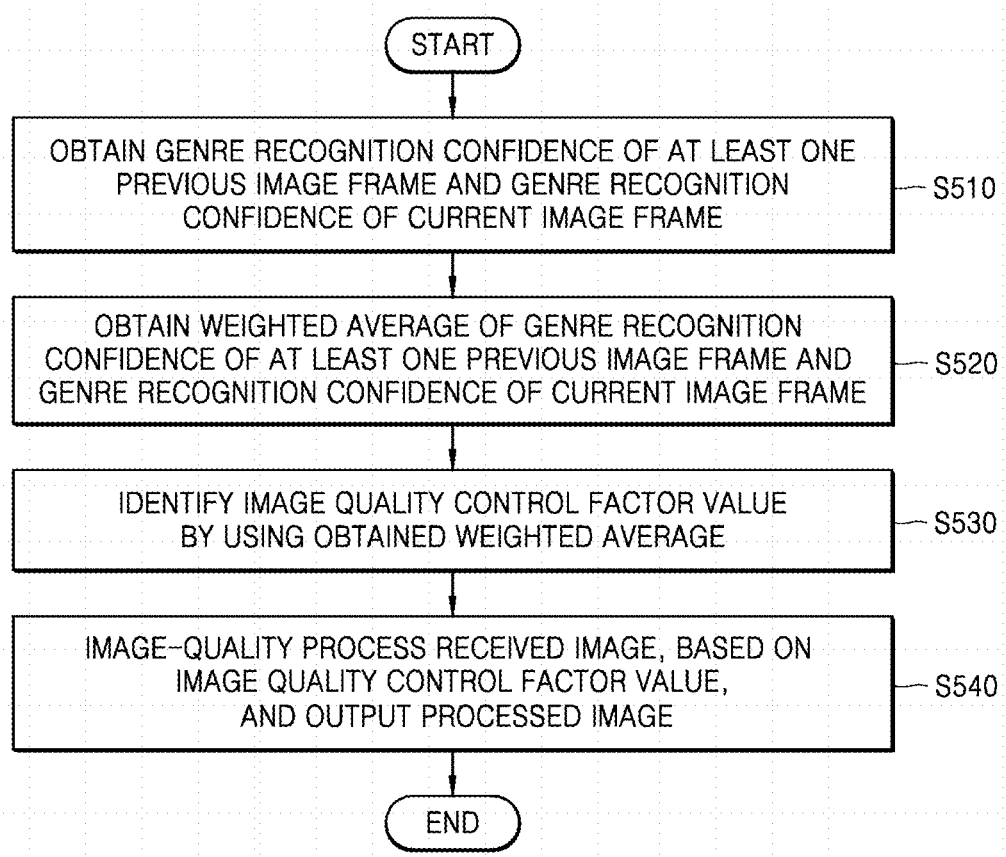
FIG. 5 is a flowchart of an image processing method, in which an image is image-quality processed by an image processing apparatus, based on a result of identifying a genre of the image, according to an embodiment.

FIG. 5 is a flowchart of an image processing method, in which an image is image-quality processed by an image processing apparatus 400, based on a result of identifying a genre of the image, according to an embodiment.

Referring to FIG. 5, in operation S510, the image processing apparatus 400 may obtain a genre recognition confidence of at least one previous image frame and a genre recognition confidence of a current image frame.

For example, the genre identifier 433 of the image processing apparatus 400 may obtain genre recognition confidence of an image frame.

In an embodiment, the genre identifier 433 may obtain the genre recognition confidence of the image frame from metadata related to or corresponding to the image frame.

In an embodiment, the genre identifier 433 may obtain the genre recognition confidence of the image frame by using vision technology.

In an embodiment, the genre identifier 433 may obtain the genre recognition confidence of the image frame by using artificial intelligence.

The at least one previous image frame may refer to one previous image frame or a plurality of previous image frames.

The at least one previous image frame may refer to an immediately preceding image frame or previous image frames for a certain time period.

In operation S520, the image processing apparatus 400 may obtain a weighted average by using the genre recognition confidence of the at least one previous image frame and the genre recognition confidence of the current image frame.

A more reliable genre recognition confidence of an image may be obtained by calculating a weighted average of the genre recognition confidence of the at least one previous image frame rather than merely using the genre recognition confidence of the current image frame.

For example, the genre identifier 433 of the image processing apparatus 400 may obtain a weighted average by using the genre recognition confidence of the at least one previous image frame and the genre recognition confidence of the current image frame.

For example, the genre identifier 433 may obtain a weighted average by using genre recognition confidence of one previous image frame and the genre recognition confidence of the current image frame.

For example, the genre identifier 433 may obtain a weighted average by using genre recognition reliabilities of a plurality of previous image frames and the genre recognition confidence of the current image frame.

The genre identifier 433 may identify a weight to be applied to genre recognition confidence of a previous image frame and a weight to be applied to the genre recognition confidence of the current image frame in various ways, when the weighted average is obtained.

In operation S530, the image processing apparatus 400 may identify image quality control factor value by using the obtained weighted average.

For example, the image-quality control factor value identifier 434 of the image processing apparatus 400 may identify the image quality control factor value, such as color, contrast enhancement (CE), or detail enhancement (DE), to be proportional to the weighted average. Thus, the image quality control factor value of each genre may be increased when the weighted average is large and be reduced when the weighted average is small.

In operation S540, the image processing apparatus 400 may image-quality process a received image, based on the image quality control factor value, and output the processed image.

For example, the image quality processor 436 of the image processing apparatus 400 may image-quality process the image by using the image quality control factor value and output the processed image. According to an embodiment, the image-quality processing the image may be processing the quality of the image.

Figure 6:
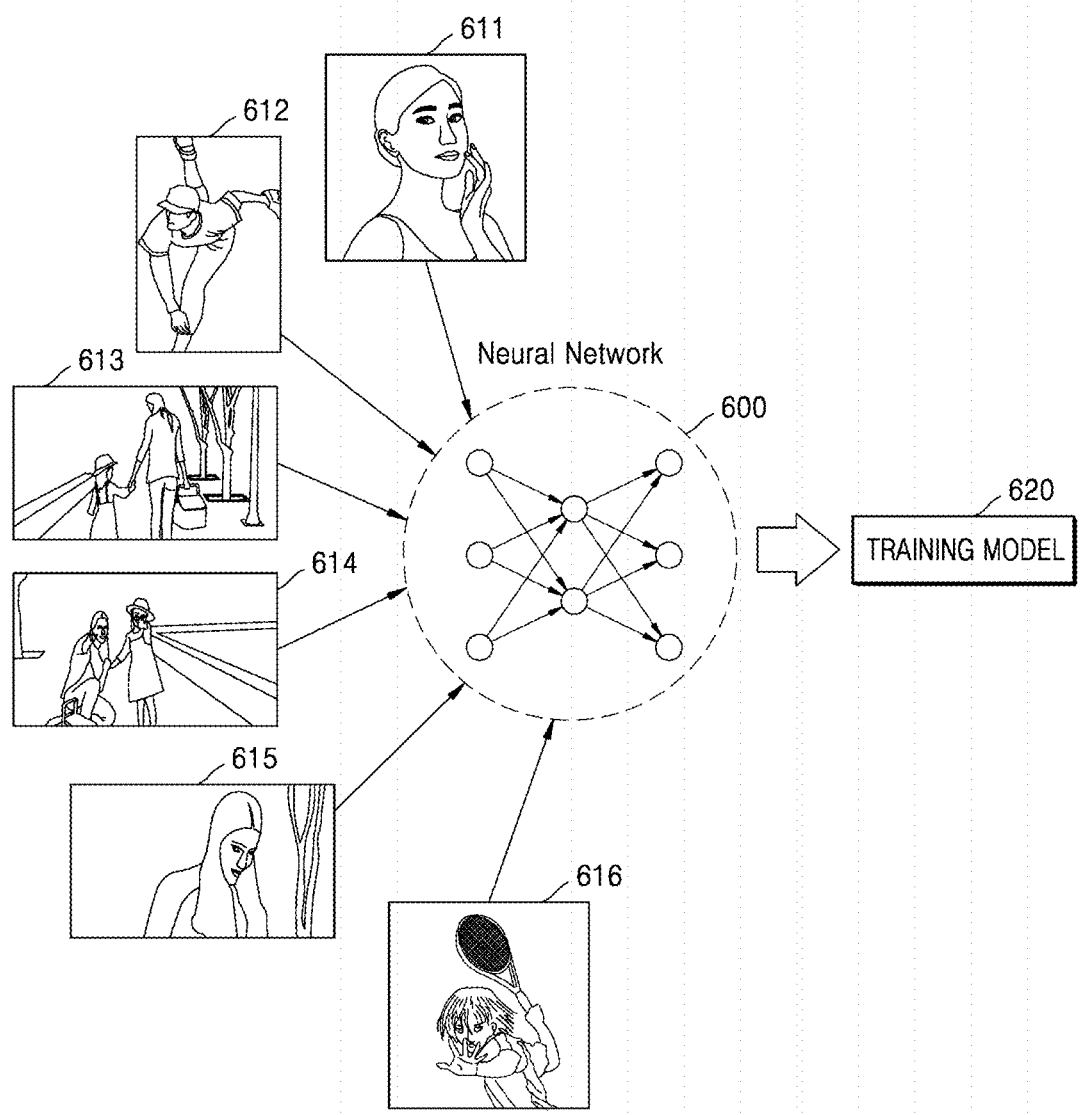
FIG. 6 is a diagram of an example of a neural network for training a genre corresponding to features of an image from the image, according to an embodiment.

FIG. 6 is a diagram of an example of a neural network for training a genre corresponding to features of an image from the image, according to an embodiment.

Referring to FIG. 6, the at least one neural network 600 may be trained with a method of obtaining a genre of an image from the image by using a plurality of training images 611 to 616 as input values. The plurality of training images 611 to 616 may include various images to be processed by an image processing apparatus.

The at least one neural network 600 may be trained with a method of obtaining a genre corresponding to a plurality of training images, in response to an input of the plurality of training images 611 to 616, and a training model 620 may be generated based on a result of training the at least one neural network 600.

Here, the training model 620 may be a trained neural network itself through which a desired result may be obtained. In detail, to obtain information regarding a genre corresponding to features of an image, a neural network is trained using a plurality of training images to set a plurality of weights to be applied to a plurality of nodes forming the neural network. Here, the weights may refer to values of connection between the nodes of the neural network. The weights may be optimized through iterative training and may be iteratively modified until the accuracy of a result meets certain confidence. The training model 620 may be a neural network formed by finally set weights.

In some embodiments, a method of obtaining a genre corresponding to features of an image from the image by using at least one neural network 600 may be trained in advance. The training model 620 may be updated when some of the plurality of training images are changed. For example, as a user views an image through an image processing apparatus, the viewed image may be used as a training image. In addition, at least one image viewed by the user may be extracted in units of a certain time intervals (e.g., 24-hour intervals), and used as a training image. When a new training image is added, the at least one neural network 600 may be further trained with a method of identifying an object from an image, and thus, the training model 620 may be updated.

The training of the method of obtaining a genre corresponding to features of an image from the image by using the at least one neural network 600 may be performed by an image processing apparatus, and may be performed by an external server in another embodiment. For example, the training of the method of obtaining a genre corresponding to features of an image from the image by using the at least one neural network 600 may require a relatively complex calculation. Accordingly, the amount of calculation to be performed by the image processing apparatus may be reduced by training the external server may be trained with this method and receiving the training model 620 from the external server by the image processing apparatus. The image processing apparatus may receive the training model 620 in advance from the external server, store the training model 620 in a memory, and obtain a genre corresponding to an image by using the stored training model 620.

In another embodiment, the image processing apparatus may include a neural network processor which is a separate dedicated processor to be trained via the at least one neural network 600. The neural network processor may be trained via the at least one neural network 600, identify the training model 620, and perform a genre obtaining process by using the identified training model 620.

Performing an operation by the at least one neural network 600 will be additionally described with reference to FIG. 7 below.

Figure 7:
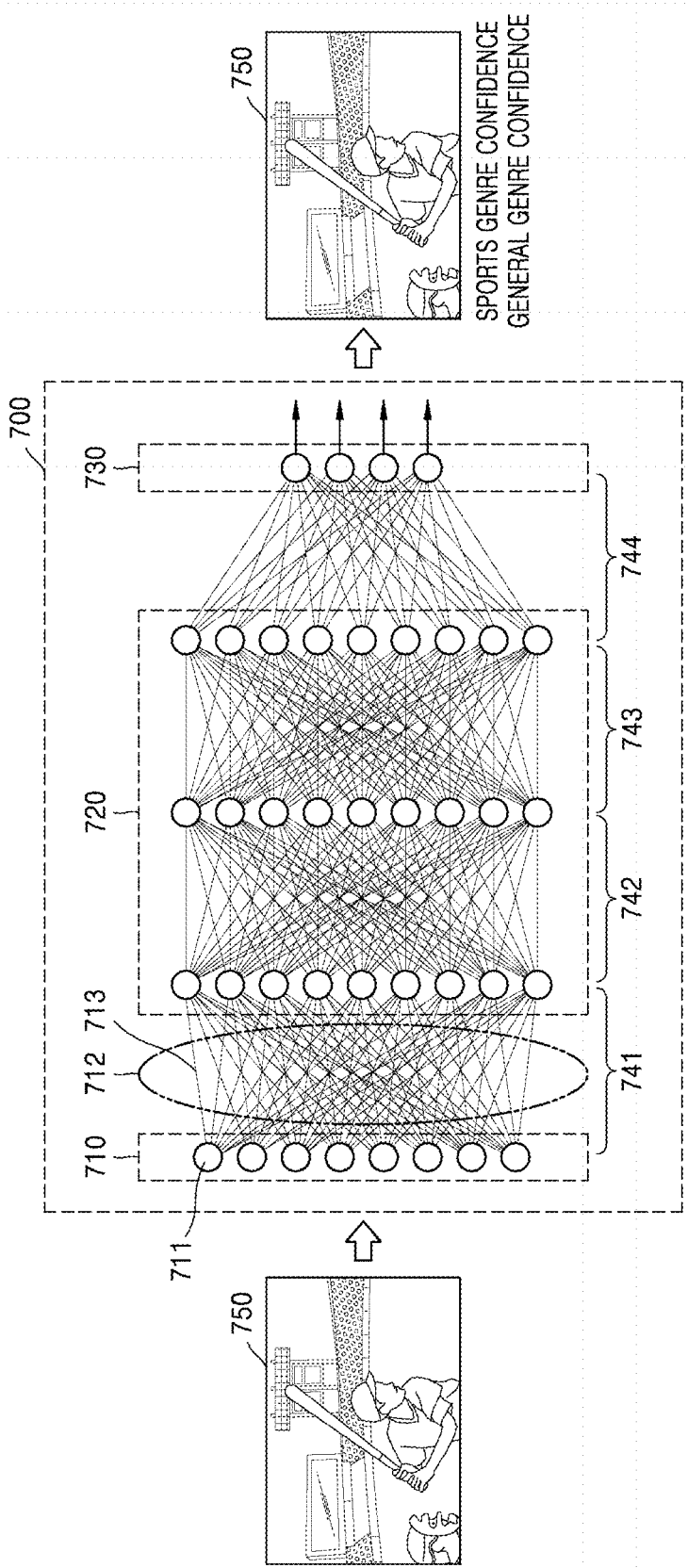
FIG. 7 is a diagram for explaining obtaining genre recognition confidence of an input image from the input image by using a neural network, according to an embodiment.

FIG. 7 is a diagram for explaining obtaining genre recognition confidence of an input image from the input image by using a neural network, according to an embodiment. In detail, FIG. 7 illustrates a deep neural network (DNN) 700 in which a hidden layer has three depths.

Referring to FIG. 7, the DNN 700 may be trained with training data. The trained DNN 700 may perform an inference operation for object recognition. Here, the DNN 700 may be variously designed according to a model implementation method (e.g., a convolution neural network (CNN) or the like), the accuracy of a result, the confidence of the result, an operation processing speed of a processor, the capacity of the processor, etc.

The DNN 700 may include an input layer 710, a hidden layer 720, and an output layer 730 and perform an operation of obtaining metadata. The DNN 700 may include a first layer 741 between an input layer 710 and a first hidden layer, a second layer 742 between the first hidden layer and the second hidden layer, a third layer 743 between the second hidden layer and a third hidden layer, and a fourth layer 744 between the third layer and an output layer 730.

Each of the plurality of layers of the DNN 700 may include at least one node. For example, the input layer 710 may include at least one node (e.g., a plurality of nodes 711) to receive data. FIG. 7 illustrates an example in which the input layer 710 includes a plurality of nodes. A plurality of images obtained by scaling an image 750 may be input to the plurality of nodes 711. In detail, the plurality of images obtained by scaling the image 750 in units of frequency bands may be input to the plurality of nodes 711.

Here, two adjacent layers are connected to each other via a plurality of edges 712 (e.g., the plurality of edges 712 including a number of individual edge 713) as illustrated in FIG. 7. Each of the plurality of nodes is assigned a weight corresponding thereto, so that the DNN 700 may obtain output data, based on a value obtained by performing an operation, e.g., a multiplication operation, on an input signal and the weight.

The DNN 700 may be trained based on a plurality of training images to be configured as a model for extracting information regarding a genre corresponding to an image by identifying features of the image. In detail, in order to increase the accuracy of a result output via the DNN 700, training may be repeatedly performed in a direction from the output layer 730 to the input layer 710, based on a plurality of training images, and weights may be modified.

The DNN 700 assigned finally modified weights is available as a metadata extraction model. In detail, the DNN 700 may analyze information included in a plurality of training images which are input data and output a result indicating a genre corresponds to the plurality of training images.

Accordingly, when the image 750 to be processed is received by an image processing apparatus, the DNN 700 may extract features from the image 750 by using a plurality of layers, at least one node, and at least one edge and identify a genre corresponding to the image 750, based on the extracted features. For example, when the image 750 to be processed is received by the image processing apparatus, the DNN 700 may output a confidence that the genre of the image 750 is identified as a first genre and a confidence that the genre of the image 750 is identified as a genre other than the first genre. For example, the DNN 700 may receive the image 750 and output a confidence that the genre of the image 750 is a sports genre and a confidence that the genre of the image 750 is a general genre other than the sports genre.

Figure 8:
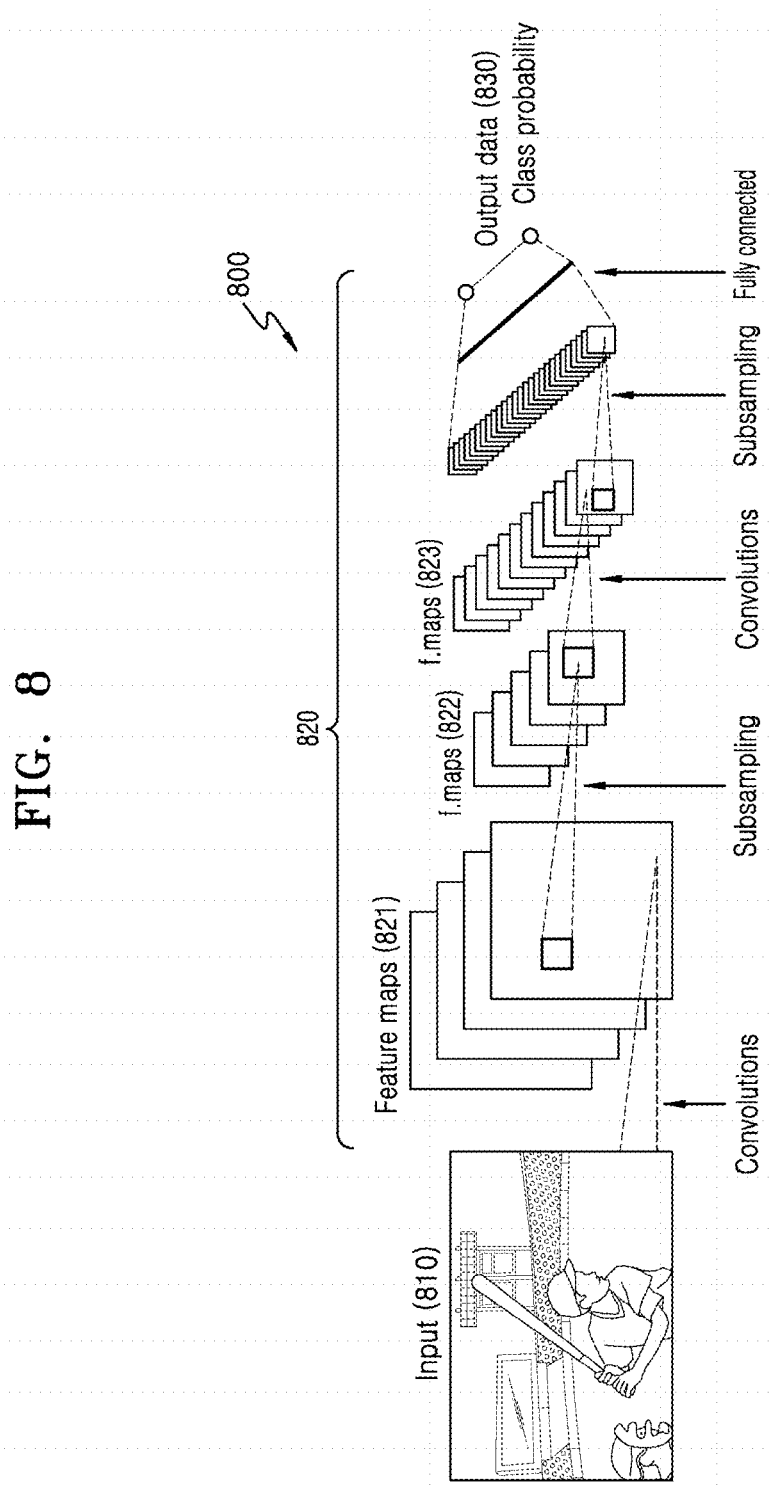
FIG. 8 is a diagram illustrating a structure of a convolutional neural network according to an embodiment.

FIG. 8 is a diagram illustrating a structure of a convolutional neural network 800 according to an embodiment.

Referring to FIG. 8, the convolutional neural network 800 has a structure, in which input data 810 is input and is passed through N convolution layers 820 to output output data 830.

At this time, the convolutional neural network 800 may be a deep convolutional neural network with two or more convolutional layers.

In an embodiment, an image processing apparatus may extract "features", such as a border, a line, and a color, from the input image by using the convolutional neural network 800. Each of the N convolutional layers 820 included in the convolutional neural network 800 may receive data, process the received data, and produce output data. For example, the image processing apparatus may generate a first feature map 821 by performing a convolution operation on an image input to the first convolution layer 820 with at least one kernel or filter. Furthermore, a second feature map 822 may be obtained by sub-sampling the generated first feature map 821, and a third feature map 823 may be generated by inputting the second feature map 822 into the second convolution layer 820 and performing the convolution operation on the second convolution layer input to the second convolution layer 820 with at least one kernel or filter.

Initial convolutional layers of the convolutional neural network 800 may be operated to extract low-level features, such as edges or gradients, from an input image. More complex features (e.g., eyes, a nose, a mouth, a face, etc.) may be extracted from later convolution layers.

In the convolutional neural network 800, one or more convolutional layers that receive and output feature maps may be hidden layers (e.g., hidden convolutional layers). In the convolutional neural network 800, other processing operations may be performed, as well as the convolution operation performed by applying at least one kernel to a feature map. For example, operations such as an activation function, pooling, and the like may be performed. The image processing apparatus may apply the activation function to convert values of a feature map extracted, as a result of performing the convolution operation, into nonlinear values indicative of "features" or "non-features". At this time, a ReLu function may be used but embodiments are not limited thereto. In addition, the image processing apparatus may perform sub-sampling (pooling) to reduce the size of an extracted feature map.

Figure 9:
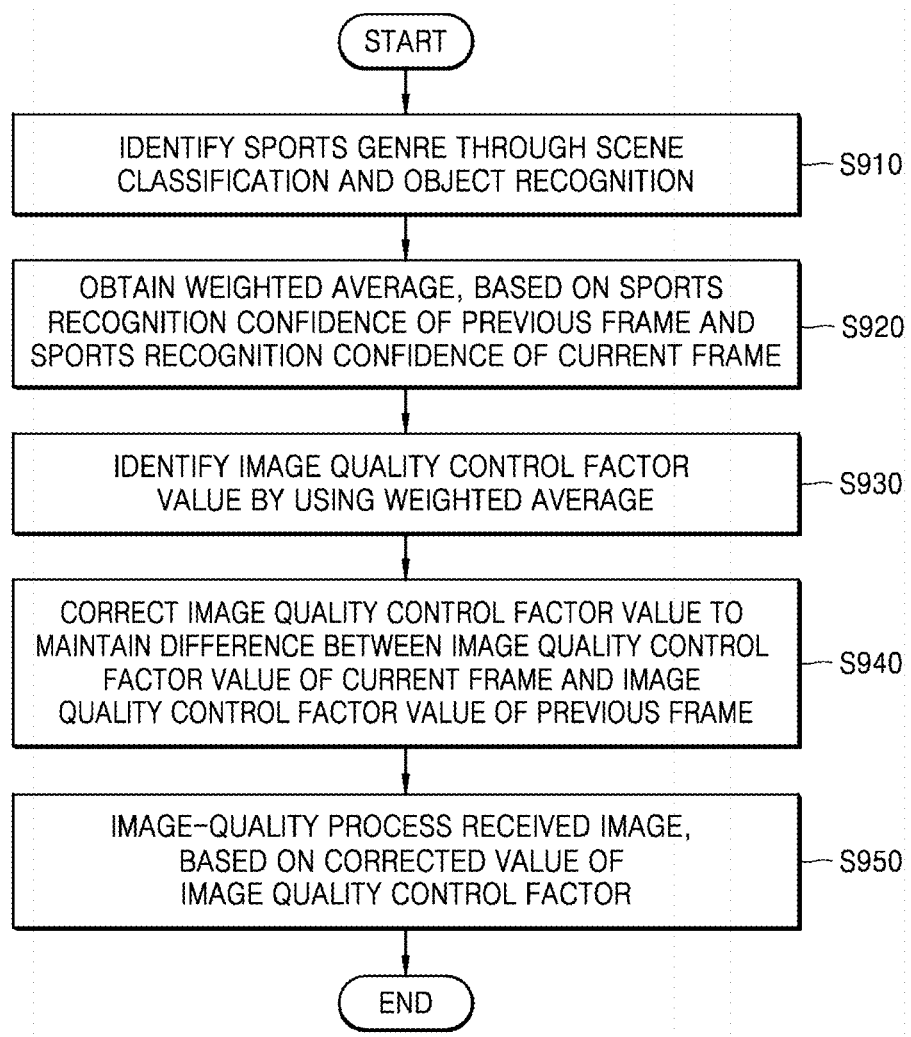
FIG. 9 is a flowchart of an image processing method of image-quality processing an image when a genre of the image is identified as a sports genre, according to an embodiment.

FIG. 9 is a flowchart of an image processing method of image-quality processing an image when a genre of the image is identified as a sports genre, according to an embodiment.

Referring to FIG. 9, in operation S910, an image processing apparatus may identify a sports genre by performing scene classification and object recognition on an input image.

The image processing apparatus may identify the sports genre by classifying a scene of an input image frame through identification of a stadium or a game scene in the input image frame and identifying an object through identification of a player, a game tool, or a logo in the input image frame.

The image processing apparatus may identify the genre of the input image frame by using various techniques. For example, the image processing apparatus may use machine learning described above with reference to FIGS. 6 to 8 to identify the genre of the input image frame.

The image processing apparatus may analyze the input image frame to obtain a sports content confidence indicating a probability that the genre of the input image frame is a sports genre and a general content confidence indicating a probability that the genre of the input image frame is a general image genre other than the sports genre.

As one example, the image processing apparatus may use a result of identifying one image frame as a result of identifying whether the genre of the input image is the sports genre. That is, the image processing apparatus may use a sports content confidence and a general content confidence which are obtained from one input image frame.

As one example, the image processing apparatus may use a result of identifying a plurality of image frames as a result of identifying whether the genre of the input image is the sports genre. That is, the image processing apparatus may use a sports recognition confidence obtained for a predetermined time or from a predetermined number of image frames.

In operation S920, the image processing apparatus may obtain a weighted average, based on a sports recognition confidence of a previous frame and a sports recognition confidence of a current frame.

For example, the image processing apparatus may obtain the weighted average by multiplying the sports recognition confidence of the previous frame by a first weight, multiplying the sports recognition confidence of the current frame by a second weight, and calculating an average of the results of multiplication. The weighted average may be referred to as, for example, a sports control weight.

Here, the first weight and the second weight may be variously determined according to a type of apparatus. For example, the first weight and the second weight may be determined such that the sum thereof is 1.

For example, the first weight may be increased to add weight to the sports recognition confidence of the previous frame, and the second weight may be increased to add weight to the sports recognition confidence of the current frame.

As one example, the previous frame and the current frame may be adjacent frames.

As one example, the previous frame and the current frame may not necessarily be adjacent frames and may be a temporally preceding frame and a temporally following frame. For example, when a frame is selected at certain time intervals, e.g., one frame is selected at three-frame intervals, a first frame may be the previous frame and a fourth frame may be the current frame.

In operation S930, the image processing apparatus 400 may identify image quality control factor value by using the weighted average.

The image processing apparatus may identify the image quality control factor value by using the weighted average. Examples of the image quality control factor may include color, contrast enhancement (CE), detail enhancement (DE), etc. For example, the image processing apparatus may identify the image quality control factor value in proportion to the weighted average. A large weighted average may be understood to mean that an image is likely to correspond to a sports image and thus the image quality control factor value may be increased to image-quality process the image to be suitable for a sports image. A small weighted average may be understood to mean that an image is less likely to correspond to a sports image and thus the image quality control factor value may be reduced to prevent deterioration of the quality of the image.

As one example, the image processing apparatus may identify the image quality control factor value by using one weighted average.

As one example, the image processing apparatus may identify the image quality control factor value by using a plurality of multiple weighted averages. That is, the image processing apparatus may identify the image quality control factor value when a plurality of weighted averages obtained for a predetermined time or from a predetermined number of image frames satisfy a certain criterion.

In operation S940, the image processing apparatus may correct the image quality control factor value of the current frame to maintain a difference between the image quality control factor value of the current frame and the image quality control factor value of the previous frame. According to an embodiment, the image processing apparatus may correct the image quality control factor value of the current frame such that the difference between the image quality control factor value of the current frame and the image quality control factor value of the previous frame does not exceed a certain value.

The image processing apparatus may adjust the image quality control factor value when the difference between the image quality control factor value identified for the current frame and image quality control factor value identified for the previous frame is large. When viewing images, a user may feel uncomfortable due to a sudden change of image quality, when the difference between the image quality control factor value of the previous frame and the image quality control factor value of the current frame is large. The adjusting of the image quality control factor value is performed to prevent this problem.

For example, the image processing apparatus may set a maximum value of the difference between the image quality control factor value of the previous frame and the image quality control factor value of the current frame, and adjust the image quality control factor value of the current frame when the difference exceeds the maximum value. For example, in case that the image processing apparatus sets the maximum value of the difference between the image quality control factor value of the previous frame and the image quality control factor value of the current frame to 2, the image processing apparatus may correct the image quality control factor value of the current frame to 0.5 to prevent the difference from exceeding 0.2, when the image quality control factor value of the previous frame is 0.7, the image quality control factor value of the current frame is 0.4 and thus the difference therebetween exceeds 0.2.

In operation S950, the image processing apparatus may image-quality process the input image, based on the corrected image quality control factor value.

The image processing apparatus may image-quality process the input image by reflecting the image quality control factor value corrected in operation S940 and output the image quality-processed image.

Figure 10:
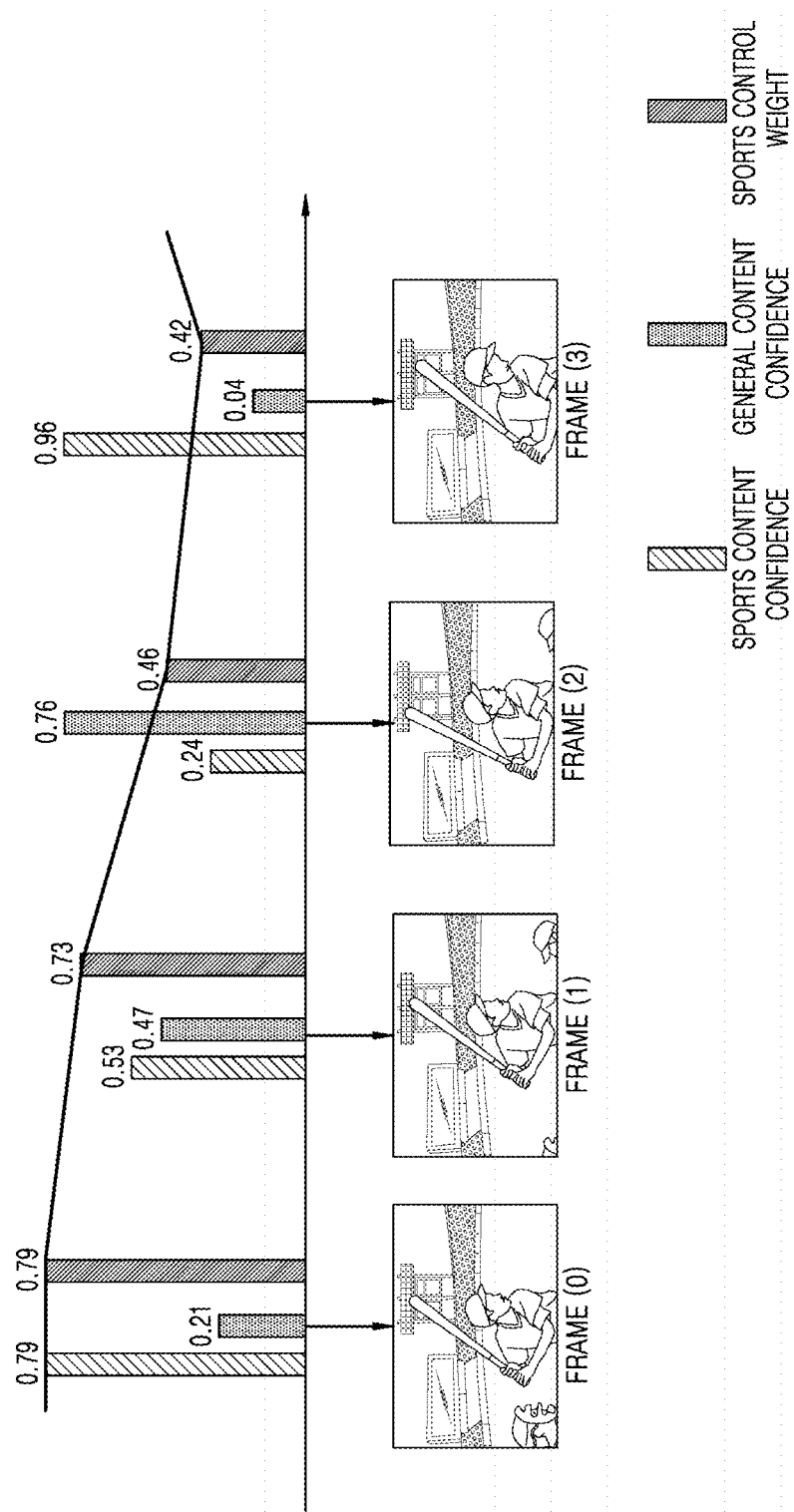
FIG. 10 illustrates an example in which a sports control weight changes according to a weighted average of a confidence information value of a previous frame and a confidence information value of a current frame, according to an embodiment.

FIG. 10 illustrates an example in which a sports control weight changes according to a weighted average of a confidence information value of a previous frame and a confidence information value of a current frame, according to an embodiment.

Referring to FIG. 10, a frame 0 is a first frame and there is no previous frame. The sports control weight may be obtained, for example, by multiplying a sports content confidence of a previous frame by a first weight, multiplying a sports content confidence of a current frame by a second weight, and calculating a sum of the two results of multiplication. The first weight value and the second weight value may be variously determined according to the system.

Sports control weight of frame=(sports control confidence of previous frame×first weight)+(sports control confidence of current frame×second weight).

Because the frame 0 is the first frame and there is no previous frame, a sports control weight for the frame 0 may be the same value as a sports content confidence therefor.

Although a sports content confidence of a frame 1, which is a current frame, is 0.53, by calculating the weighted average of this value with 0.79, which is the sports control confidence of the frame 0, which is a previous frame, the sports control weight of the frame 1 is 0.73. In this example, a weight of a previous frame may be set to ¾ and a weight of a current frame may be set to ¼. Therefore, the sports control weight of the frame 1 may be calculated as follows.

Sports control weight of frame

=(sports control confidence of frame 0×first weight '¾')+(sports control confidence of frame 1×second weight '¼')

=(0.79×(¾))+(0.53×(¼))

=0.73

In case of a frame 2, a general content confidence is 0.76 and a sports content confidence is 0.24 and thus a sports genre is erroneously identified as a general content genre. In this case, 0.46 which is a weight average with the previous frame (when the weight of the previous frame is ¾ and the weight of the current frame is ¼) may be set as a sports control weight of the frame 2 instead of using a sports content recognition probability of 0.24 as a control factor weight, so that the difference between the sports control weight of the frame 2 and the sports control weight, i.e., 0.73, of the frame 1 which is the previous frame may not be large. Therefore, it is possible to reduce image quality deterioration due to an error in a certain frame, i.e., the frame 2 in the above example.

As another example, when the difference between a sports control weight of a current frame and a sports control weight of a previous frame is large, the difference may be adjusted to a certain value (e.g., 0.1) or less. For example, the difference between the sports control weights of the frame 2 and the frame 1 is (0.73-0.46) and thus is greater than 0.1. Thus, the sports control weight of the frame 2 may be intentionally adjusted to 0.63, thereby reducing a sudden change of control factor value between these frames.

Figure 11:
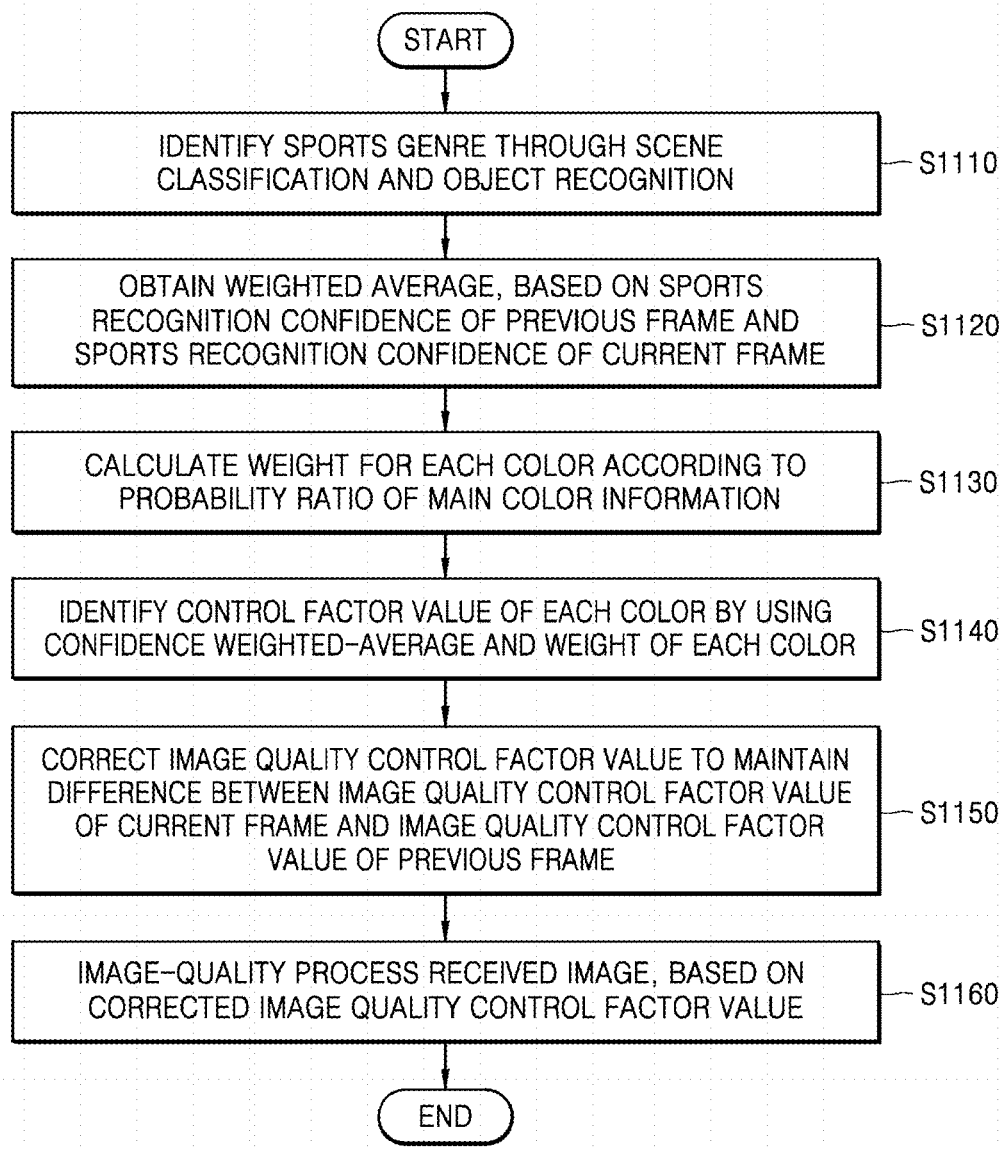
FIG. 11 is a flowchart of a method of identifying image quality control factor value, based on color probability distribution information, as well as a genre recognition confidence, according to an embodiment.

FIG. 11 is a flowchart of a method of identifying image quality control factor value, based on color probability distribution information, as well as a genre recognition confidence, according to an embodiment. A description of operations that are the same as those of FIG. 9 will be omitted here.

Referring to FIG. 11, in operation 1110, an image processing apparatus may identify a sports genre by performing scene classification and object recognition on an input image.

The image processing apparatus may analyze an input image frame to obtain a sports recognition confidence indicating a probability that a genre of the input image frame is a sports genre and a general recognition confidence indicating a probability that the genre of the input image frame is a general image genre other than the sports genre.

In operation 1120, the image processing apparatus may obtain a weighted average, based on a sports recognition confidence of a previous frame and a sports recognition confidence of a current frame.

In operation 1130, the image processing apparatus may calculate a weight for each color according to a probability ratio of main color information.

A probability distribution of a certain hue section of HSV color coordinates may be used as an example of a color probability distribution to obtain a main representative color distribution of the input image. Table 1 below defines a representative color of each hue section. For example, in a soccer game, green color is expected to be dominant and thus a probability of a corresponding hue value section may be high.

TABLE 1

| Hue value distribution | Representative color |
|---|---|
| (Hue >= 0 and Hue < 15) or (Hue >= 165 and Hue < 180) | Red |
| Hue >= 15 and Hue < 36 | Yellow |
| Hue >= 36 and Hue < 86 | Green |
| Hue >= 86 and Hue < 105 | Cyan |
| Hue >= 105 and Hue < 135 | Blue |
| Hue >= 35 and Hue < 165 | Magenta |

When genre-specific image quality control is performed by enhancing saturation of a certain color, the saturation of the color may be adjusted in proportion to a probability distribution of the color. For example, when an input image scene is identified as a soccer game, a probability distribution of green in this scene may be taken into consideration, as well as a confidence related to genre recognition, and the saturation of green may be additionally increased when a ratio of green is high, thereby increasing image quality.

In operation 1140, the image processing apparatus may identify control factor value of each color by using a confidence weighted-average and a weight of each color.

When a sports confidence weighted-average is large, a corresponding image is likely to be a sports image. Thus, the image processing apparatus may increase image quality control factor value and further use a weight of each color to identify the control factor value of each color.

For example, when a distribution of green color in an input image such as a soccer or baseball game is high, the saturation of green color may be additionally increased. When a distribution of blue color in an input image such as a swimming competition is high, the saturation of blue color may be additionally increased. For example, when a distribution of white color in an input image such as ice sports is high, the saturation of white color may be additionally increased.

In operation 1150, the image processing apparatus may correct the image quality control factor value of the current frame to maintain a difference between the image quality control factor value of the current frame and the image quality control factor value of the previous frame. According to an embodiment, the image processing apparatus may correct image quality control factor value such that the difference between image quality control factor value of the current frame and image quality control factor value of the previous frame does not exceed a certain value.

The image processing apparatus may adjust the image quality control factor value when the difference between image quality control factor value identified for the current frame and image quality control factor value identified for the previous frame is large. When viewing images, a user may feel uncomfortable due to a sudden change of image quality, when the difference between the image quality control factor value of the previous frame and the image quality control factor value of the current frame is large. The adjusting of the image quality control factor value is performed to prevent this problem.

In operation 1160, the image processing apparatus may image-quality process the input image, based on the corrected image quality control factor value.

The image processing apparatus may image-quality process the input image by reflecting the image quality control factor value corrected in operation 1160 and output the image quality-processed image.

Figure 12:
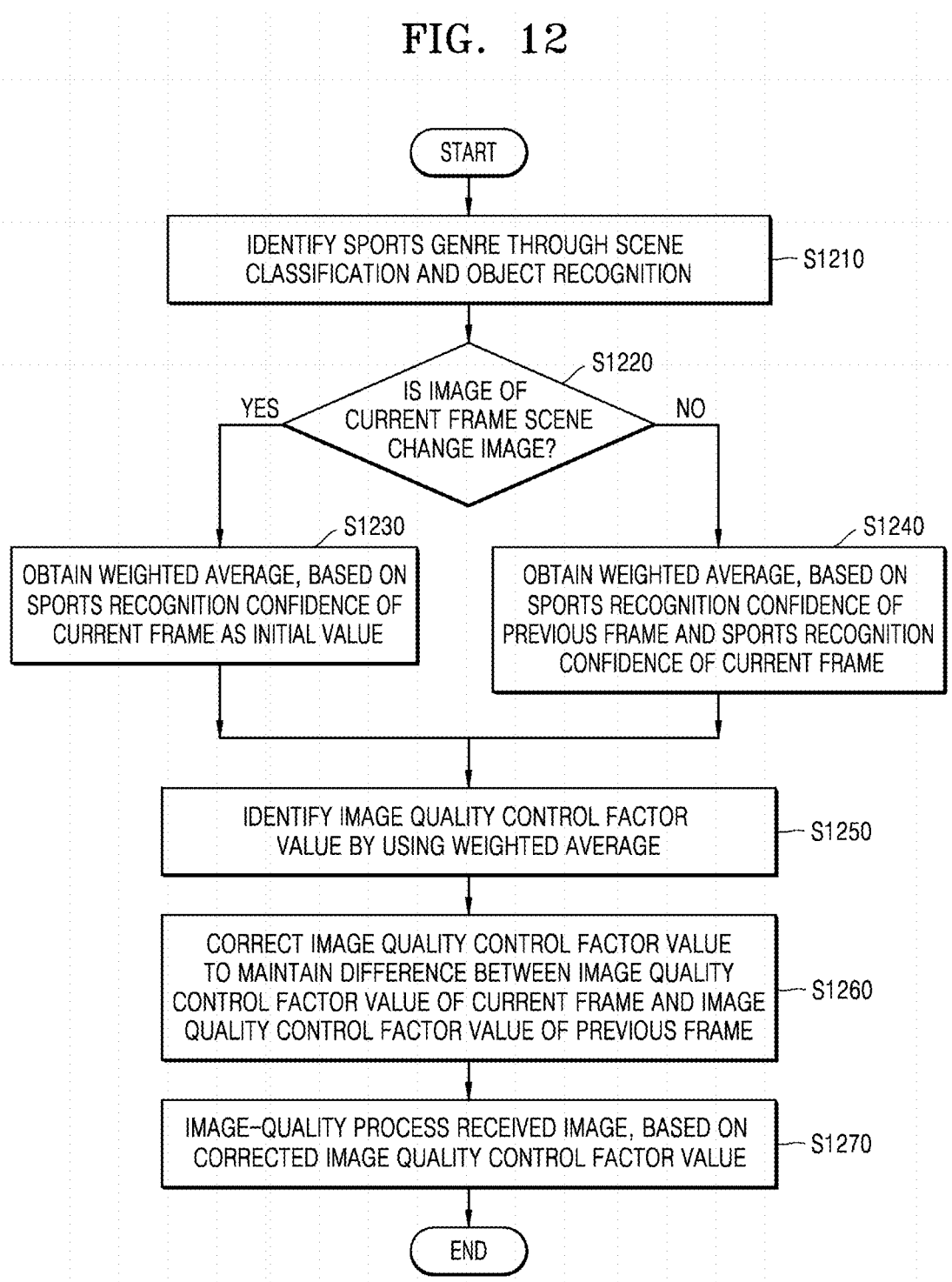
FIG. 12 is a flowchart illustrating an image quality control operation performed in consideration of a scene change section, based on a genre recognition confidence, according to an embodiment.

FIG. 12 is a flowchart illustrating an image quality control operation performed in consideration of a scene change section, based on a genre recognition confidence, according to an embodiment.

Referring to FIG. 12, in operation 1210, an image processing apparatus may identify a sports genre by performing scene classification and object recognition on an input image.

The image processing apparatus may analyze a frame of the input image to obtain a sports recognition confidence indicating a probability that a genre of the frame of the input image is a sports genre and a general recognition confidence indicating a probability that the genre of the frame of the input image is a general image genre other than the sports genre.

In operation 1220, the image processing apparatus may identify whether an image of a current frame is a scene change image.

When the image of the current frame is a scene change image having different features from those of an image of a previous frame, the features of the image of the current frame may be significantly different from those of the image of the previous frame. As described above, when the image of the current frame is a scene change image, the image of the current frame is likely to be an image not related to the image of the previous frame and thus it may not be desirable that a genre confidence of the current frame is identified using sports recognition confidence information of the previous frame. Thus, when the image of the current frame is identified as the scene change image, only a genre recognition confidence of the current frame may be used as an initial value to obtain a weight of the image quality control factor value, instead of using a weight of a genre recognition confidence of the previous frame as in FIG. 9.

An image histogram may be used as an example of an image analysis for analyzing whether the image of the current frame is the scene change image. A histogram distribution of brightness value information of the current frame is obtained, the difference between a probability distribution value of each histogram section and a histogram probability distribution value of the same section of the previous frame is obtained, and whether the sum of the histogram distribution and the difference is equal to or greater than a threshold may be determined to determine whether the image of the current image is the scene change image.

When the image of the current frame is identified as the scene change image, operation 1230 is performed, in which the image processing apparatus may obtain a weighted average, based on a sports recognition confidence of the current frame as an initial value.

When the current frame is identified as not the scene change image, operation 1240 is performed, in which the image processing apparatus may obtain the weighted average, based on the sports recognition confidence of the previous frame and the sports recognition confidence of the current frame.

In operation 1250, the image processing apparatus may identify image quality control factor value by using the weighted average.

The image processing apparatus may identify the image quality control factor value by using the weighted average. Examples of an image quality control factor may include color, contrast enhancement (CE), detail enhancement (DE), etc. For example, the image processing apparatus may identify the image quality control factor value in proportion to the weighted average.

In operation 1260, the image processing apparatus may correct the image quality control factor value of the current frame to maintain a difference between the image quality control factor value of the current frame and the image quality control factor value of the previous frame. According to an embodiment, the image processing apparatus may correct the image quality control factor value such that the difference between the image quality control factor value of the current frame and the image quality control factor value of the previous frame does not exceed a certain value.

The image processing apparatus may adjust image quality control factor value when the difference between image quality control factor value identified for the current frame and image quality control factor value identified for the previous frame is large. This is to prevent a sudden change in image quality control, caused when the difference between the image quality control factor value of the previous frame and the image quality control factor value of the current frame is large, which may give an uncomfortable feeling to a user when the image is viewed.

In operation 1270, the image processing apparatus may image-quality process the input image, based on the corrected image quality control factor value.

The image processing apparatus may image-quality process the input image by reflecting the image quality control factor value corrected in operation 1260, and output the image quality-processed image.

Figure 13:
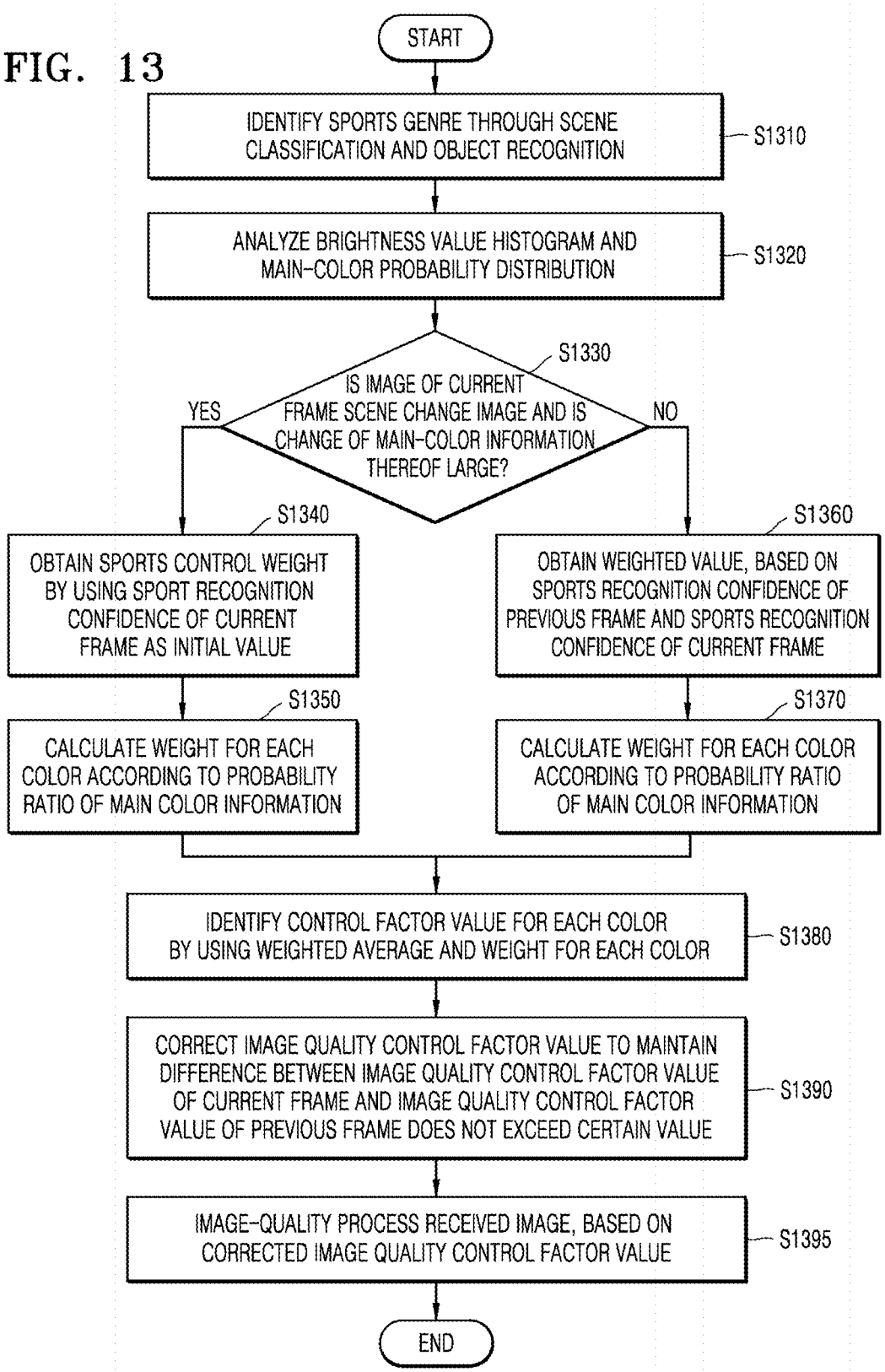
FIG. 13 is a flowchart of an image quality processing method based on a genre recognition confidence and a color probability distribution of a scene change section, according to an embodiment.

FIG. 13 is a flowchart of an image quality processing method based on a genre recognition confidence and a color probability distribution of a scene change section, according to an embodiment.

In the method of FIG. 13, color probability distribution information is additionally used as an image quality control factor, as well as the genre recognition confidence of FIG. 7.

Referring to FIG. 13, in operation 1310, an image processing apparatus may identify a sports genre by performing scene classification and object recognition on an input image.

In operation 1320, the image processing apparatus may analyze a brightness value histogram and a main-color probability distribution.

The image processing apparatus may analyze the brightness value histogram to identify a scene change image.

In operation 1330, the image processing apparatus may identify whether an image of a current frame is a scene change image and whether a change of main-color information thereof is large.

A main-color distribution in a scene may be similar, although whether a scene change occurs is identified, based on the brightness value histogram analyzed in operation 1320. Even a scene change image may show a similar probability distribution of main colors, and a frame 7 illustrated in FIG. 14 corresponds thereto.

When the image of the current frame is a scene change image and the change of the main color information is large, operation 1340 is performed, in which a sports control weight may be obtained using a sports recognition confidence of the current frame as an initial value.

When the image of the current frame is a scene change image and the change of the main color information thereof is large, a genre of the image of the current frame is likely to be completely different from that of the image of the previous frame. When the image of the current frame is a scene change image having different features from those of the image of the previous frame, the features of the image of the current frame may be significantly different from those of the image of the previous frame. As described above, when the image of the current frame is a scene change image, the image of the current frame is likely to be an image not related to the image of the previous frame and thus it may not be desirable that a genre confidence of the current frame is identified using the sports recognition confidence information of the previous frame. Thus, when the image of the current frame is identified as the scene change image, a weight of the image quality control factor value may be used by using only the genre recognition confidence of the current frame as an initial value, instead of using a weight of the genre recognition confidence of the previous frame.

Figure 14:
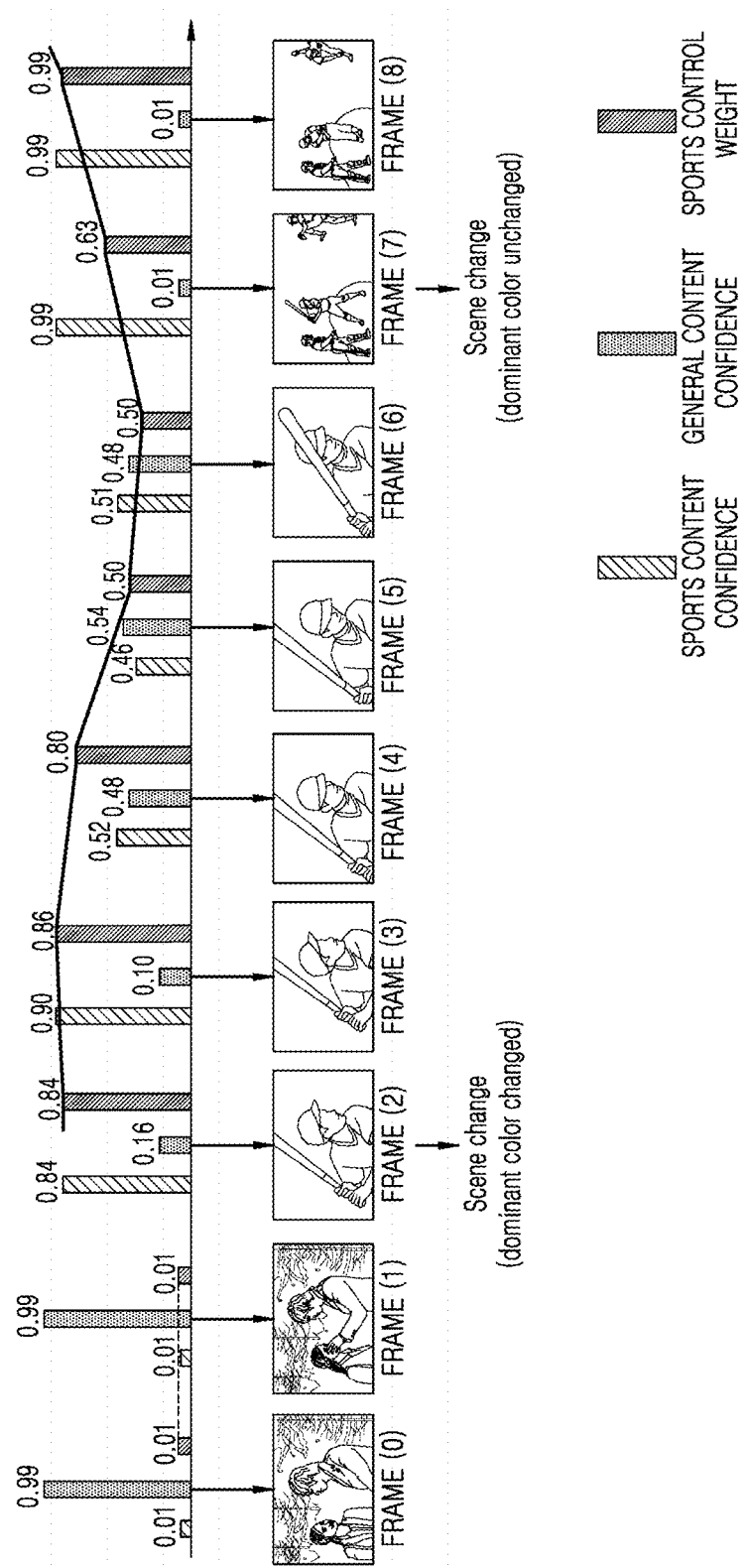
FIG. 14 illustrates an example of calculating a weight of an image quality control factor, based on a sports genre recognition confidence in a scene change section by the method of FIG. 13, according to an embodiment.

For example, a frame 2 illustrated in FIG. 14 is a scene change image and a change in main color information thereof is large. In this case, for example, a frame 0 and a frame 1 correspond to a movie genre but sports images start from the frame 2. When a scene change occurs due to a change in a genre of an image as described above, the image is a scene change image and a change of main color information thereof may be large.

In operation 1350, the image processing apparatus may calculate a weight for each color according to a probability ratio of the main color information.

When it is identified in operation 1330 that the image of the current frame is a scene change image but the change of the main color information is not large, operation 1360 is performed, in which the image processing apparatus may obtain a weighted value, based on the sports recognition confidence of the previous frame and the sports recognition confidence of the current frame.

For example, when a scene change occurs but a similar main color distribution is shown as in the frame 7 of FIG. 14, the images of the previous frame and the current frame are likely to be images of different scenes although the genres thereof are the same. In this case, because the genres of the images of the previous frame and the current frame are determined to be the same, a weighted average of genre recognition confidence information of the previous frame and the main color distribution may be used to calculate image quality control factor value.

In operation 1370, the image processing apparatus may calculate a weight for each color according to a probability ratio of main color information.

In operation 1380, the image processing apparatus may identify control factor value for each color by using the weighted average and the weight for each color.

In operation 1390, the image processing apparatus may correct the image quality control factor value of the current frame to maintain a difference between the image quality control factor value of the current frame and the image quality control factor value of the previous frame. According to an embodiment, the image processing apparatus may correct the image quality control factor value such that the difference between the image quality control factor value of the current frame and the image quality control factor value of the previous frame does not exceed a certain value.

In operation 1395, the image processing apparatus may image-quality process the input image, based on the corrected image quality control factor value.

The image processing apparatus may image-quality process the input image by reflecting the image quality control factor value corrected in operation 1390, and output the image quality-processed image.

FIG. 14 illustrates an example of calculating a weight of an image quality control factor, based on a sports genre recognition confidence in a scene change section by the method of FIG. 13, according to an embodiment.

A frame 0 and a frame 1 correspond to images of, for example, a movie, a sports content confidence thereof is 0.01, and are identified as general images not sports images.

A frame 2 shows a different main color distribution and thus may be identified as a scene change image by an image processing apparatus. Thus, the image processing apparatus may calculate a sports control weight of the frame 2 by using a sports content confidence of a current frame without using a sports content confidence of a previous frame of the frame 2. For example, referring to FIG. 14, the sports control weight of the frame 2 is 0.84 which is the same as the sports content confidence thereof. Thus, a sports control weight of a scene change image, such as the frame 2, to be used to identify image quality control factor value is significantly different from a sports control weight of the frame 1 which is the previous frame.

A scene change occurs in a frame 7 but an image of the frame 7 may not be identified as a scene change image by the image processing apparatus, because it is determined that a main color distribution thereof is not changed. Therefore, the image processing apparatus may calculate a sports control weight by using a sports content confidence of a frame 6 which is a previous frame of the frame 7 and a sports content confidence of the frame 7. For example, in FIG. 14, the sports content confidence of the frame 6 is 0.51 and the sports content confidence of the frame 7 is 0.99. Thus, for example, when a first weight is ¾ and a second weight is ¼, the sports control weight of the frame 7 is 0.63(=0.51×(¾)+0.99×(¼)). Accordingly, the image of the frame 7 is a scene change image but is the same sports image as the frame 6 which is a previous frame and thus is not identified as the scene change image. Thus, the sports control weight may be calculated using the sports content confidence of the frame 6 to prevent a sports control weight to be used to identify image quality control factor value of the frame 7 from being significantly different from the sports control weight of the frame 6 which is a previous frame.

FIGS. 15A to 15D illustrate examples of image quality control factors according to embodiments.

In embodiments, image quality control factors may include color saturation, color temperature, a contrast ratio, and sharpness.

Figure 15A:
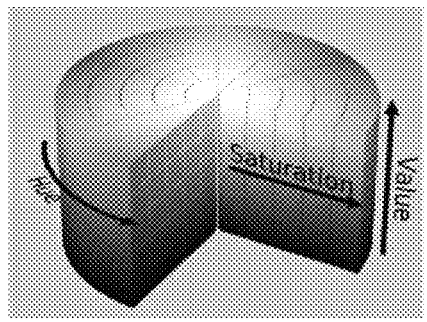
FIGS. 15A to 15D illustrate examples of image quality control factors according to embodiments.

FIG. 15A illustrates color saturation.

Main colors are controlled to be clearer by increasing color saturation.

Colors may be enhanced by controlling the saturation of a certain color. For example, in case of a sports genre, an image processing apparatus may emphasize the main colors (green, yellow, blue, and white) for differential image quality control of each sports game.

Figure 15B:
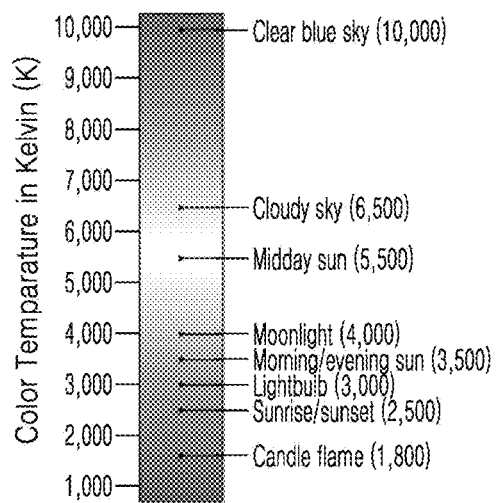

FIG. 15B illustrates a color temperature.

A color temperature may be controlled in a certain section according to a genre. In case of sports, the color temperature may be increased to obtain a clear and cool white color. An overall color tone may be changed to be warmer or cooler by adjusting the color temperature.

Figure 15C:
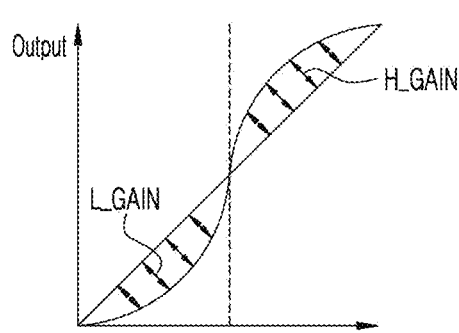

FIG. 15C illustrates a contrast ratio.

In contrast enhancement (CE), the image processing apparatus may control contrasts of low-gradation pixels and high-gradation pixels of a luminance signal to a low-gradation gain L_GAIN and a high-gradation gain H_GAIN after YCbCr conversion of RGB signals. A dark area may become darker by increasing the low-gradient gain L_GAIN and a light area may become lighter by increasing the high-gradient gain H_GAIN, thereby increasing contrast.

The image processing apparatus may control each relative intensity according to features of a content genre. For example, the contrast ratio may be emphasized by applying a strong gain value to a sports image.

The contrast ratio is controlled to reduce a low gradation (so that a dark place may be become darker) and increase a high gradation (so that a light place may be become lighter), when the low-gradation gain L_GAIN and the high-gradation gain H_GAIN are high. The contrast ratio is controlled in a manner reverse to the above manner when the low-gradation gain L_GAIN and the high-gradation gain H_GAIN for control of the contrast ratio are low.

Figure 15D:
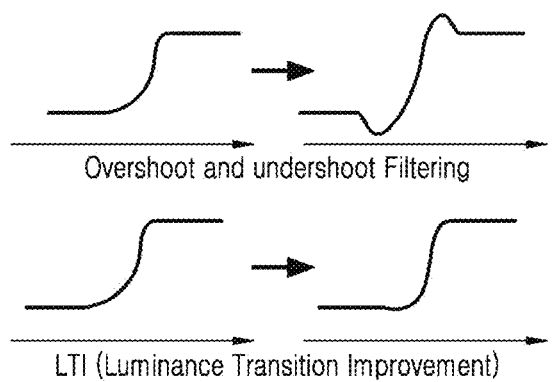

FIG. 15D illustrates a sharpness control filter.

In detail enhancement (DE), control is performed such that outlines are sharp and details are improved using the filter of FIG. 15D giving overshooting and undershooting, and a transition time of an edge is reduced to provide a sharp outline as illustrated in FIG. 15D.

Figure 16:
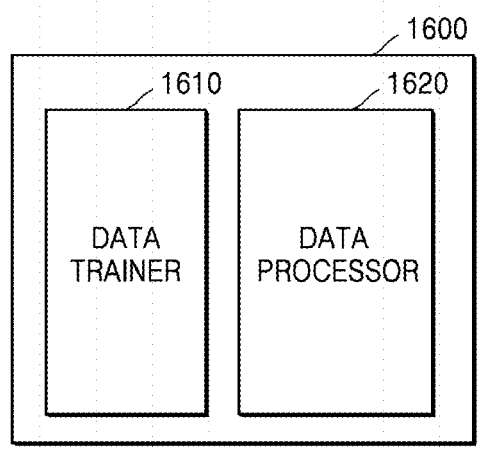
FIG. 16 is a block diagram illustrating a configuration of a processor for identifying a genre of an image, according to an embodiment.

FIG. 16 is a block diagram illustrating a configuration of a processor 1600 for identifying a genre of an image, according to an embodiment. The processor 1600 for identifying a genre of an image may be included in the genre identifier 433 of FIG. 4, may be configured as a separate processor outside the genre identifier 433, or included in an external device of the image processing apparatus 400.

Referring to FIG. 16, a processor 1600 according to an embodiment may include a data trainer 1610 and a data processor 1620.

The data trainer 1610 may be trained with a criterion for obtaining a genre recognition confidence of an image from an input image to train a neural network according to an embodiment. The data trainer 1610 may be trained with a criterion regarding information (e.g., feature information) of an image to be used to obtain a genre recognition confidence of the image. In addition, the data trainer 1610 may be trained with a criterion as to how to obtain the genre recognition confidence by using the feature information of the image. The data trainer 1610 may be trained with the criterion for obtaining the genre recognition confidence from the image by obtaining data (e.g., the image) to be used for training and applying the data to a data processing model (a neural network).

Data processing models may be constructed in consideration of a field to which recognition models are applied, a purpose of training, the computer performance of a device, or the like. The data processing models may be, for example, models based on a neural network. For example, models such as a Deep Neural Network (DNN), a Recurrent Neural Network (RNN), and a Bidirectional Recurrent Deep Neural Network (BRDNN) may be used as a data processing model but embodiments are not limited thereto.

In addition, the data processing models may be trained by the data trainer 1610 by using, for example, a learning algorithm including an error back-propagation method or a gradient descent method or the like.

When the data processing models are trained, the data trainer 1610 may store the trained data processing models. In this case, the data trainer 1610 may store the trained data processing models in a memory of a display device. Alternatively, the data trainer 1610 may store the trained data processing models in a memory of a server connected to the display device via a wired or wireless network.

In this case, the memory storing the trained data processing models may also store, for example, a command or data related to at least another component of an image processing apparatus. The memory may also store software and/or programs. The program may include, for example, a kernel, middleware, an application programming interface (API), and/or an application program (or "application").

The data processor 1620 may input an image to a data processing model, including the trained neural network, and the data processing model may output, as a result value, genre recognition confidence information corresponding to the image. The output result value may be used to update the data processing model, including the neural network.

At least one of the data trainer 1610 or the data processor 1620 may be manufactured in the form of at least one hardware chip and mounted on the display device. For example, at least one of the data trainer 1610 or the data processor 1620 may be manufactured in the form of a dedicated hardware chip for artificial intelligence (AI) or manufactured as part of an existing general-purpose processor (e.g., a CPU or an application processor) or part of part of a graphics dedicated processor (e.g., a GPU), and mounted on various types of electronic devices as described above.

In this case, the data trainer 1610 and the data processor 1620 may be mounted on one image processing apparatus or different image processing apparatuses. For example, one of the data trainer 1610 and the data processor 1620 may be included in the image processing apparatus and the other may be included in a server. The data trainer 1610 and the data processor 1620 may be connected to each other via wire or wirelessly to provide information regarding a model constructed by the data trainer 1610 to the data processor 1620 and provide, as additional training data, data input to the data processor 1620 to the data trainer 1610.

At least one of the data trainer 1610 or the data processor 1620 may be embodied as a software module. When at least one of the data trainer 1610 or the data processor 1620 is embodied as a software module (or a program module including an instruction(s)), the software module may be stored in a non-transitory computer-readable recording medium. In this case, the software module may be provided by an operating system (OS) or a certain application. Alternatively, part of the software module may be provided by the OS and the remaining software module may be provided by the application.

A control method of an image processing apparatus according to an embodiment may be embodied in the form of program commands executable through various computer means and recorded on a non-transitory computer-readable recording medium. The non-transitory computer-readable recording medium may include program commands, data files, data structures, etc. solely or in combination. The program commands recorded on this computer-readable recording medium may be specially designed and configured for the disclosure or may be known and available to those of skill in the art of computer software. Examples of the computer-readable recording medium include magnetic media such as hard disks, floppy disks and magnetic tapes, optical media such as CD-ROMs and DVDs, magnetooptical media such as floptical disks, and hardware devices such as ROM, RAM, flash memory, and the like which are specifically configured to store and execute program commands. Examples of the program commands include not only machine language code prepared by a compiler, but also high-level language code executable by a computer by using an interpreter.

According to various embodiments, adequate image quality control may be performed according to a genre of image content by more reliably identifying the genre of the image content. In particular, image quality of a sports-genre image content may be optimally controlled.

In various embodiments, image quality of image content including main colors may be more appropriately controlled by additionally using information regarding the main colors of the image content. For example, image quality of sports image content, such as green background sports image or white background sports image, may be more appropriately controlled according to main colors thereof.

While embodiments have been described above in detail, the scope of the disclosure is not limited thereto and should be understood to include various modifications and improvements made by those of ordinary skill in the art, based on basic principles of the disclosure defined in the following claims.

What is claimed is:

1. An image processing apparatus comprising:
    a decoder configured to decode image frames;
    an image quality controller configured to obtain a first genre recognition confidence of a previous image frame indicating a first probability that a genre of the previous image frame is a first genre and a second genre recognition confidence of a current image frame indicating a second probability that a genre of the current image frame is the first genre, and identify an image quality control factor value for being used in processing an image quality of at least one of the decoded image frames, based on the first genre recognition confidence of the previous image frame and the second genre recognition confidence of the current image frame; and
    an image quality processor configured to process the image quality of at least one of the decoded image frames based on the image quality control factor value, and output the processed at least one of the decoded image frames.

2. The image processing apparatus of claim 1, wherein the image quality controller is further configured to:
    obtain a first weighted average of the first genre recognition confidence of the previous image frame and the second genre recognition confidence of the current image frame; and
    identify the image quality control factor value based on the first weighted average.

3. The image processing apparatus of claim 1, wherein the image quality controller is further configured to correct the image quality control factor value to maintain a difference between the image quality control factor value identified for the current image frame and a previous image quality control factor value identified for the previous image frame to be below a threshold.

4. The image processing apparatus of claim 1, wherein the image quality controller is further configured to:
    based on image frames received for a predetermined time having same genre, identify the same genre as a new genre; and
    based on the identifying of the same genre as the new genre, obtain the first genre recognition confidence of the previous image frame and the second genre recognition confidence of the current image frame.

5. The image processing apparatus of claim 2, wherein the image quality controller is further configured to identify the image quality control factor value based on a first main-color probability distribution of the previous image frame and a second main-color probability distribution of the current image frame.

6. The image processing apparatus of claim 5, wherein the image quality controller is further configured to:
    obtain a second weighted average of the first main-color probability distribution of the previous image frame and the second main-color probability distribution of the current image frame;
    identify the image quality control factor value based on the first weighted average of the first genre recognition confidence and the second genre recognition confidence and the second weighted average of the first main-color probability distribution and the second main-color probability distribution; and
    process the image quality of the image frames based on the image quality control factor value.

7. The image processing apparatus of claim 1, wherein the image quality controller is further configured to:
    identify whether the current image frame is a scene change frame; and
    based on identifying that the current image frame is the scene change frame, set the first genre recognition confidence of the previous image frame to a minimum value, and identify the image quality control factor value, based on the first genre recognition confidence of the previous image frame set to the minimum value and the second genre recognition confidence of the current image frame.

8. The image processing apparatus of claim 1, wherein the image quality controller is further configured to:
    identify whether the current image frame is a scene change frame and whether a level of change of main color information of the current image frame exceeds a threshold;
    based on identifying that the current image frame is the scene change frame and the level of change of the main color information exceeds the threshold, set the first genre recognition confidence of the previous image frame to a minimum value, and identify the image quality control factor value, based on the first genre recognition confidence of the previous image frame set to the minimum value and the second genre recognition confidence of the current image frame; and
    based on identifying that the current image frame is the scene change frame and the level of change of the main color information does not exceed the threshold, identify the image quality control factor value, based on the first genre recognition confidence of the previous image frame and the second genre recognition confidence of the current image frame.

9. The image processing apparatus of claim 1, wherein the image quality controller is further configured to identify the first genre recognition confidence of the previous image frame and the second genre recognition confidence of the current image frame based on at least one neural network.

10. An image processing method comprising:
    decoding image frames;
    performing image quality control by obtaining a first genre recognition confidence of a previous image frame indicating a first probability that a genre of the previous image frame is a first genre and a second genre recognition confidence of a current image frame indicating a second probability that a genre of the current image frame is the first genre, and identifying an image quality control factor value for being used in processing an image quality of at least one of the decoded image frames, based on the first genre recognition confidence of the previous image frame and the second genre recognition confidence of the current image frame; and processing the image quality of at least one of the decoded image frames based on the image quality control factor value, and outputting the processed at least one of the decoded image frames.

11. The image processing method of claim 10, wherein the performing of the image quality control comprises:
obtaining a first weighted average of the first genre recognition confidence of the previous image frame and the second genre recognition confidence of the current image frame; and
identifying the image quality control factor value based on the first weighted average.

12. The image processing method of claim 10, wherein the performing of the image quality control comprises correcting the image quality control factor value to maintain a difference between the image quality control factor value identified for the current image frame and a previous image quality control factor value identified for the previous image frame to be below a threshold.

13. The image processing method of claim 10, wherein the performing of the image quality control comprises:
based on the image frames received for a predetermined time have same genre, identifying the same genre as a new genre; and
based on the identifying of the same genre as the new genre, obtaining the first genre recognition confidence of the previous image frame and the second genre recognition confidence of the current image frame.

14. The image processing method of claim 11, wherein the performing of the image quality control comprises identifying the image quality control factor value based on a first main-color probability distribution of the previous image frame and a second main-color probability distribution of the current image frame.

15. The image processing method of claim 14, wherein the performing of the image quality control comprises:
obtaining a second weighted average of the first main-color probability distribution of the previous image frame and the second main-color probability distribution of the current image frame; and
identifying the image quality control factor value based on the first weighted average of the first genre recognition confidence and the second genre recognition confidence and the second weighted average of the first main-color probability distribution and the second main-color probability distribution, and
the processing the image quality of the at least one of the decoded image frames comprises processing the image quality of the image frames based on the image quality control factor value.

16. The image processing method of claim 10, wherein the performing of the image quality control comprises:
identifying whether the current image frame is a scene change frame; and
based on identifying that the current image frame is the scene change frame, setting the first genre recognition confidence of the previous image frame to a minimum value, and identifying the image quality control factor value, based on the first genre recognition confidence of the previous image frame set to the minimum value and the second genre recognition confidence of the current image frame.

17. The image processing method of claim 10, wherein the performing of the image quality control comprises:
identifying whether the current image frame is a scene change frame and whether a level of change of main color information of the current image frame exceeds a threshold;
based on identifying that the current image frame is the scene change frame and the level of change of the main color information exceeds the threshold, setting the first genre recognition confidence of the previous image frame to a minimum value, and identifying the image quality control factor value, based on the first genre recognition confidence of the previous image frame set to the minimum value and the second genre recognition confidence of the current image frame; and
based on identifying that the current image frame is the scene change frame and the level of change of the main color information does not exceed the threshold, identifying the image quality control factor value, based on the first genre recognition confidence of the previous image frame and the second genre recognition confidence of the current image frame.

18. The image processing method of claim 10, wherein the performing of the image quality control comprises identifying the first genre recognition confidence of the previous image frame and the second genre recognition confidence of the current image frame based on at least one neural network.

19. A computer program product comprising a non-transitory computer-readable recording medium storing a program for executing an image processing method, wherein the image processing method comprises:
decoding image frames of an image;
performing image quality control by obtaining a first genre recognition confidence of a previous image frame indicating a first probability that a genre of the previous image frame is a first genre and a second genre recognition confidence of a current image frame indicating a second probability that a genre of the current image frame is the first genre, and identifying an image quality control factor value for being used in processing an image quality of at least one of the decoded image frames, based on the first genre recognition confidence of the previous image frame and the second genre recognition confidence of the current image frame; and
processing the image quality of at least one of the decoded image frames based on the image quality control factor value, and outputting the processed at least one of the decoded image frames.

* * * * *